United States Patent [19]
Ikeda et al.

[11] Patent Number: 5,243,564
[45] Date of Patent: Sep. 7, 1993

[54] DOPPLER-EFFECT VEHICLE GROUND-SPEED DETECTING APPARATUS HAVING MEANS FOR DETECTING VEHICLE BODY INCLINATION

[75] Inventors: Shinji Ikeda; Masashi Mizukoshi, both of Susono, Japan

[73] Assignee: Toyota Jidosha Kabushiki Kaisha, Aichi, Japan

[21] Appl. No.: 921,948

[22] Filed: Jul. 30, 1992

[30] Foreign Application Priority Data

Aug. 5, 1991 [JP] Japan .................................. 3-221042
Aug. 5, 1991 [JP] Japan .................................. 3-221043
Apr. 23, 1992 [JP] Japan .................................. 4-130183

[51] Int. Cl.⁵ .......................... G01S 15/60; G01S 13/60
[52] U.S. Cl. ........................................ 367/91; 367/96; 342/104; 342/71
[58] Field of Search ................. 367/91, 904, 96; 342/104, 106, 115, 117, 71

[56] References Cited

U.S. PATENT DOCUMENTS 4,414,548  11/1983  Carpenter et al. .................. 342/106

FOREIGN PATENT DOCUMENTS 61-14586  1/1986  Japan .
62-59877  4/1987  Japan .

*Primary Examiner*—Daniel T. Pihulic
*Attorney, Agent, or Firm*—Oliff & Berridge

[57] ABSTRACT

A Doppler-effect vehicle ground-speed detecting apparatus having a transmitter fixed to a vehicle body and transmitting a wave toward a road surface on which the vehicle is running, a receiver fixed to the body and receiving a portion of the wave reflected by the road surface, and a ground-speed determining device for determining a ground-speed of the vehicle relative to the road surface, on the basis of a transmitting frequency of the wave as transmitted by the transmitter and a receiving frequency of the wave as received by the receiver. The ground-speed determining device determines the ground-speed of the vehicle, on the basis of a parameter which changes with an angle of the vehicle body relative to the road surface in a plane parallel to a running direction of the vehicle and perpendicular to the road surface, as well as on the basis of a difference between the transmitting and receiving frequencies.

16 Claims, 14 Drawing Sheets

DOPPLER-EFFECT VEHICLE GROUND-SPEED DETECTING APPARATUS HAVING MEANS FOR DETECTING VEHICLE BODY INCLINATION

BACKGROUND OF THE INVENTION

1. Field of the Invention

The present invention relates to an apparatus for detecting the ground-speed of a motor vehicle, namely, the running speed of the vehicle with respect to the road surface, by utilizing the Doppler effect, and more particularly to a technique for improving the accuracy of detection of the ground-speed.

2. Discussion of the Prior Art

A Doppler-effect vehicle ground-speed detecting apparatus is known according to JP-A 61-14586 (published in 1986), which includes (a) a transmitter fixed to a body of a vehicle, for transmitting a wave toward the road surface on which the vehicle is running, (b) a receiver fixed to the vehicle body, for receiving a portion of the wave which is reflected by the road surface, and (c) ground-speed determining means for determining the ground-speed of the vehicle relative to the road surface, on the basis of the transmitting frequency of the wave as transmitted from the transmitter, and the receiving frequency of the wave as received by the receiver.

The transmitter and receiver are fixed to the vehicle body such that the transmitter and receiver are oriented so as to face in a predetermined direction relative to the running direction of the vehicle, so that the paths along which the wave is transmitted from the transmitter and received by the receiver are at a predetermined angle relative to the road surface in a plane parallel to the running direction of the vehicle and perpendicular to the road surface. In other words, the angle of the wave transmission and reception paths relative to the road surface changes when the angle of the vehicle body in the above-indicated plane relative to the road surface changes from the nominal angle due to pitching or inclination of the vehicle body.

For example, the vehicle body undergoes pitching or inclination upon brake application or upon quick or abrupt acceleration or deceleration. Accordingly, the angle of the wave transmission and reception paths relative to the road surface deviates from the nominal angle. This deviation has an influence on the ground-speed which is detected by the detecting apparatus on the basis of the transmitting and receiving frequencies of the transmitter and receiver. Thus, the detected ground-speed of the vehicle more or less includes an error which arises from a variation in the angle of the transmitter and receiver relative to the road surface while the vehicle is running. For this reason, the conventional Doppler-effect vehicle ground-speed detecting apparatus is not satisfactory in terms of the detecting accuracy.

SUMMARY OF THE INVENTION

It is therefore an object of the present invention to provide a Doppler-effect vehicle ground-speed detecting apparatus which is capable of detecting the ground-speed of a vehicle, with high accuracy, irrespective of a change in the angle of the wave transmitter and receiver relative to the road surface, which occurs due to pitching or inclination of the vehicle body during running.

The above object may be accomplished according to the principle of the present invention, which provides a Doppler-effect vehicle ground-speed detecting apparatus having a transmitter fixed to a body of a vehicle and transmitting a wave toward a road surface on which the vehicle is running, a receiver fixed to the body and receiving a portion of the wave reflected by the road surface, and ground-speed determining means for determining a ground-speed of the vehicle relative to the road surface, on the basis of a transmitting frequency of the wave as transmitted by the transmitter and a receiving frequency of the portion of the wave as received by the receiver. The ground-speed determining means determines the ground-speed of the vehicle, on the basis of a parameter which changes with an angle of the body of the vehicle relative to the road surface in a plane parallel to a running direction of the vehicle and perpendicular to the road surface, as well as a relationship between the transmitting and receiving frequencies.

In the Doppler-effect vehicle ground-speed detecting apparatus of the present invention as described above, the ground-speed of the vehicle is determined on the basis of not only the relationship or difference between the transmitting and receiving frequencies of the wave as transmitted from the transmitter and as received by the receiver, but also the parameter which changes with the angle of the vehicle body relative to the road surface. Accordingly, a deviation of the angle of the wave transmission and reception paths relative to the road surface from the nominal or reference angle is taken into account so as to compensate the ground-speed as determined by the transmitting and receiving frequencies, for the amount of deviation of the angle of the wave transmission and reception paths from the nominal value. Therefore, the present detecting apparatus is capable of detecting or determining the ground-speed of the vehicle with higher accuracy, than the known detecting apparatus in which the ground-speed is determined solely by the Doppler effect, or the transmitting and receiving frequencies. In other words, the present apparatus assures sufficiently high accuracy of detection of the ground-speed of the vehicle, even when the vehicle body is inclined o pitched relative to the road surface, for some reason or other.

The ground-speed determining means may comprise acceleration-deceleration obtaining means for obtaining an acceleration or deceleration value of the vehicle body, as the parameter which changes with the angle of the vehicle body. Alternatively the ground-speed determining means may comprise inclination detecting means for detecting an amount of difference in the height of the vehicle body at its front and rear portions, as the parameter which changes with the angle of the vehicle body.

The latter arrangement in which the inclination detecting means is provided may be adapted such that the heights of the front and rear portions of the vehicle body from the road surface are detected by respective height sensors, so that the angle of inclination of the vehicle body is determined on the basis of the detected front and rear heights of the vehicle body. Since the ground-speed is determined not only by the transmitting and receiving frequencies (Doppler effect) but also by the angle of inclination of the vehicle body, the accuracy of detection of the ground-speed is improved.

The former arrangement using the acceleration-deceleration obtaining means for obtaining the acceleration or deceleration value of the vehicle body relies on the fact that there exists a given relationship between the angle of inclination of the vehicle body (angle of the transmitter and receiver) and the acceleration or deceleration value of the vehicle, for example, deceleration value of the vehicle upon brake application to the vehicle. The acceleration-deceleration obtaining means may use a sensor for directly detecting the acceleration or deceleration value, or means for indirectly obtaining the acceleration or deceleration value on the basis of an estimated speed of the vehicle which in turn is obtained on the basis of the rotating speeds of the vehicle wheels. In either case, the accuracy of detection of the vehicle ground-speed is improved, since the ground-speed is determined not only by the transmitting and receiving frequencies (Doppler effect) but also by the acceleration or deceleration value of the vehicle which changes with the angle of the vehicle body, i.e., the angle of the transmitter and receiver relative to the road surface.

The above arrangement utilizing the acceleration or deceleration value of the vehicle body as the parameter which changes with the angle of the vehicle body is advantageous when the detecting apparatus is used for an anti-lock brake control device adapted to regulate the braking pressure to be applied to each wheel of the vehicle, so as to avoid an excessive slip of the wheel on the road surface.

When a Doppler-effect vehicle ground-speed detecting apparatus is used for an anti-lock brake control device, the braking pressure to be applied to each of the vehicle wheels is regulated (lowered and increased) so as to prevent locking of the wheel, depending upon the rotating speeds of the wheels detected by respective wheel speed sensors, and the ground-speed of the vehicle detected by the Doppler-effect ground-speed detecting apparatus.

Referring to FIG. 16, there will be explained an example of the anti-lock brake control operation, which is initiated when the amount of slip of a vehicle wheel on the road surface exceeds a predetermined limit, due to an excessive braking pressure applied to the wheel in relation to the friction coefficient of the road surface. Where the vehicle speed is estimated based on the detected speeds of the wheels, the estimated vehicle speed is lower than the actual vehicle speed (ground-speed) as indicated at I in FIG. 16, due to the slipping or locking of the wheel. The difference between the estimated speed and the actual ground-speed of the vehicle increases as the amount of slip of the wheel increases. When the anti-lock brake control operation is initiated, the braking pressure applied to the wheel is first rapidly reduced to reduce the amount of slip, whereby the wheel speed which has been lowered begins to rise toward the actual ground-speed a given time after the commencement of reduction in the braking pressure. Consequently, the estimated vehicle speed also begins to rise.

Eventually, the estimated vehicle speed becomes equal to the actual ground-speed, and the braking pressure is alternately increased and reduced so as to prevent excessive slip of the wheel, so that the estimated vehicle speed decreases following the actual ground-speed.

It will thus be understood that a braking action on a given wheel involving an anti-lock control of the braking pressure has the following four periods:

Period A between the commencement of brake application and the commencement of the anti-lock control of the braking pressure (first reduction of the braking pressure);

Period B following the Period A and up to the moment at which the estimated vehicle speed begins to rise as a result of the first reduction of the braking pressure);

Period C following the Period B and up to the moment at which the estimated vehicle speed begins to decrease with the actual vehicle ground-speed; and Period D following the Period C and up to the termination of the anti-lock control of the braking pressure.

Period I indicated in FIG. 16 is the sum of the Period A and the Period B, and Periods II and III in the same figure are the same as the Periods C and D, respectively.

In the Period A during which the braking pressure is not regulated by the anti-lock brake control device, the amount of difference in the speeds of the wheels is as small as that when the wheels are not braked. Accordingly, the amount of variation in the estimated wheel speed obtained from the wheel speeds is relatively small in the Period A. In the Periods B, C and D during which the braking pressure applied to the relevant wheel (at least one of the wheels) is regulated in the anti-lock control mode, the speeds of the wheels tend to have a relatively large difference from each other, and the estimated wheel speed tends to have a relatively large variation. Namely, the speed of the wheel whose braking pressure is reduced by the anti-lock control device is higher than that of the wheel whose braking pressure is not reduced. It is also noted that the difference of the estimated vehicle speed from the actual vehicle speed (ground-speed) is larger in the Periods B and C, than in the Periods A and D. In other words, the accuracy of the estimated vehicle speed is lower in the Periods B and C, than in the periods A and D.

The above facts should be taken into consideration where the acceleration or deceleration value estimated on the basis of the wheel speed is utilized as the parameter which changes with the angle of the vehicle body.

It is further noted that the angle of the vehicle body changes more rapidly in the Period A immediately after the commencement of the anti-lock brake control operation (i.e., first reduction in the braking pressure), than in the subsequent Periods B, C and D. This means that the deceleration value of the vehicle changes more rapidly in the Period A than in the Periods B, C and D. In this respect, the means for obtaining indirectly or directly the acceleration or deceleration value as the parameter which changes with the vehicle body angle should have a high response to the change in the actual vehicle ground-speed in the Period A.

In view of the above finding, the acceleration-deceleration obtaining means of the ground-speed determining means preferably comprises: (a) an acceleration-deceleration sensor for detecting an acceleration or deceleration value of the body of the vehicle; and (b) acceleration-deceleration determining means for repeatedly determining successive samples of the acceleration or deceleration values on the basis of an output of the acceleration-deceleration sensor. The acceleration-deceleration determining means obtains a first value as the parameter which changes with the angle of the vehicle body, on the basis of a predetermined first number of the successive samples as counted from the last sample, during a first period of time after commencement of application of a brake to the vehicle. During a second period of time following the first period, the acceleration-deceleration determining means obtains a second value as the above parameter on the basis of a predetermined second number of the successive samples as counted from the last sample. The second number is larger than the first number.

According to the above feature of the invention, the number of the samples of the acceleration or deceleration values used during the first or initial period immediately after the commencement of brake application is smaller than the number of the samples used during the second or following period. This arrangement assures good response of the obtained acceleration or deceleration value and therefore good response of the detected vehicle ground-speed) to the change in the actual acceleration or deceleration value, even in the initial period (Period A) in which the deceleration value of the vehicle changes more rapidly than in the following period (Periods B, C and D). This means that the angle of the vehicle body is accurately represented by the obtained acceleration or deceleration value, even in the initial period immediately following the brake application. Further, the present arrangement assures sufficiently high accuracy of determination of the acceleration or deceleration value in the second period (Periods B, C and D), since the number of the samples of the acceleration or deceleration value used in the second period is made larger than the number of the samples used in the first period. In the present arrangement wherein the samples of the acceleration or deceleration value are obtained directly from the acceleration-deceleration sensor, the ground-speed of the vehicle determined by the acceleration-deceleration obtaining means is not influenced even in the second period during which the braking pressures applied to the wheels are regulated in the anti-lock control mode and the estimated vehicle speed obtained on the basis of the wheel speeds tends to fluctuate from from the actual speed.

According to an alternative preferred feature of this invention, the Doppler-effect vehicle ground-speed detecting apparatus may be suitably used for an anti-lock brake control device which is adapted to control the braking pressure applied to each of the wheels, so as to avoid excessive locking of each wheel, on the basis of the rotating speed of the wheel detected by the corresponding wheel speed sensor and the ground-speed of the vehicle determined by the acceleration-deceleration obtaining means of the ground-speed determining means. In this arrangement, the acceleration-deceleration obtaining means comprises: (a) vehicle-speed estimating means for obtaining an estimated speed of the vehicle, on the basis of the rotating speeds of the plurality of wheels detected by the wheel speed sensors; (b) sampling means for obtaining samples of the acceleration or deceleration value of the body of the vehicle, each of the samples being equal to a difference between successive two values of the estimated speed of the vehicle obtained by the vehicle-speed estimating means; and (c) acceleration-deceleration determining means for receiving the samples of the acceleration or deceleration value one after another from the sampling means. The acceleration-deceleration determining means obtains a first value as the parameter which changes with the angle of the vehicle body, on the basis of a predetermined first number of the samples as counted from the last received sample, during a first period of time between commencement of application of the braking pressure to each wheel and a moment between commencement of anti-lock control of the braking pressure and commencement of an increase in the estimated speed of the vehicle as a result of the anti-lock control of the braking pressure. Further, the acceleration-deceleration determining means determines as the above parameter the first value which is obtained last during the first period of time, during a second period of time between expiration of the first period and commencement of a decrease in the estimated speed of the vehicle. During a third period of time between expiration of the second period and termination of the anti-lock control of the braking pressure, the acceleration-deceleration determining means obtains a second value as the parameter on the basis of a predetermined second number of the samples as counted from the last sample. The second number is larger than the first number.

According to the above of the invention, each sample of the acceleration or deceleration value is obtained on the basis of the estimated values of the vehicle speed, which are estimated on the basis of the wheel speeds. In the first period (Period A, or Periods A and B), the number of the samples of the acceleration or deceleration value is made smaller than that used in the third period (Period D), whereby the response of the obtained acceleration or deceleration value to the actual acceleration or deceleration value is improved, for the same reason as described above. In the second period (Periods B and C, or Period C), the the acceleration or deceleration value which was obtained last in the first period is used as the parameter which changes with the angle of the vehicle body. That is, the samples obtained in the second period are not used to obtain the parameter, since the estimated vehicle speed obtained on the basis of the wheel speeds considerably fluctuates in the second period during which the wheel speeds have a relatively large variation due to the anti-lock control of the braking pressure. Instead, the acceleration or deceleration value obtained last in the first period is used as the parameter. Further, in the third period (Period D) during which the estimated vehicle speed decreases with the actual vehicle speed, the number of the samples is made larger than that used in the first period, so that the accuracy of determination of the acceleration or deceleration value is improved.

In either of the above two features, the acceleration-deceleration determining means may be adapted to obtain an average of the predetermined number of the samples of the acceleration or deceleration value, or obtain the acceleration or deceleration value on the basis of a regression line obtained from the predetermined number of the samples.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
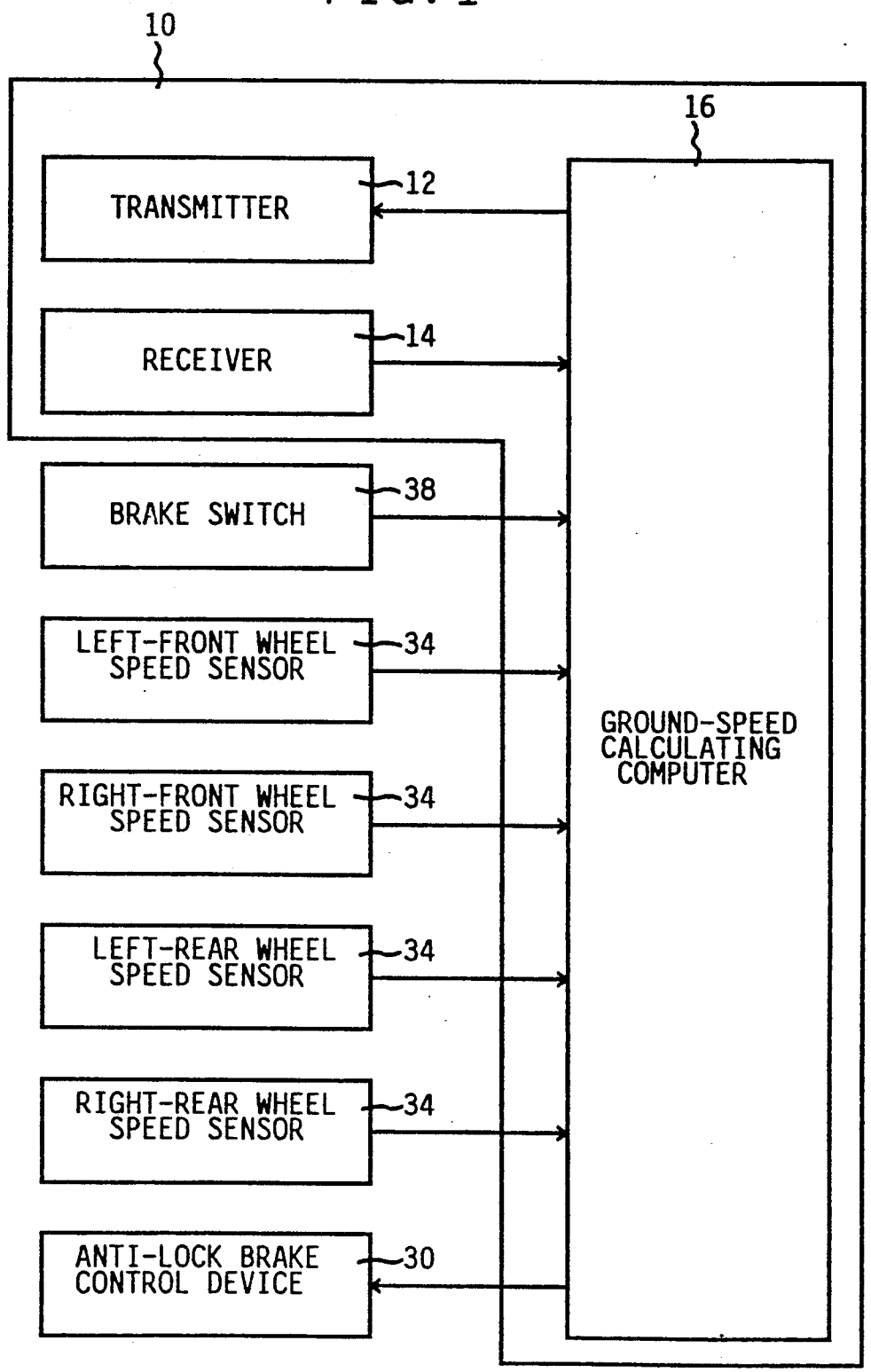
FIG. 1 is a schematic block diagram showing a Doppler-effect vehicle ground-speed detecting apparatus for a motor vehicle according to a first embodiment of the present invention.
Figure 3:
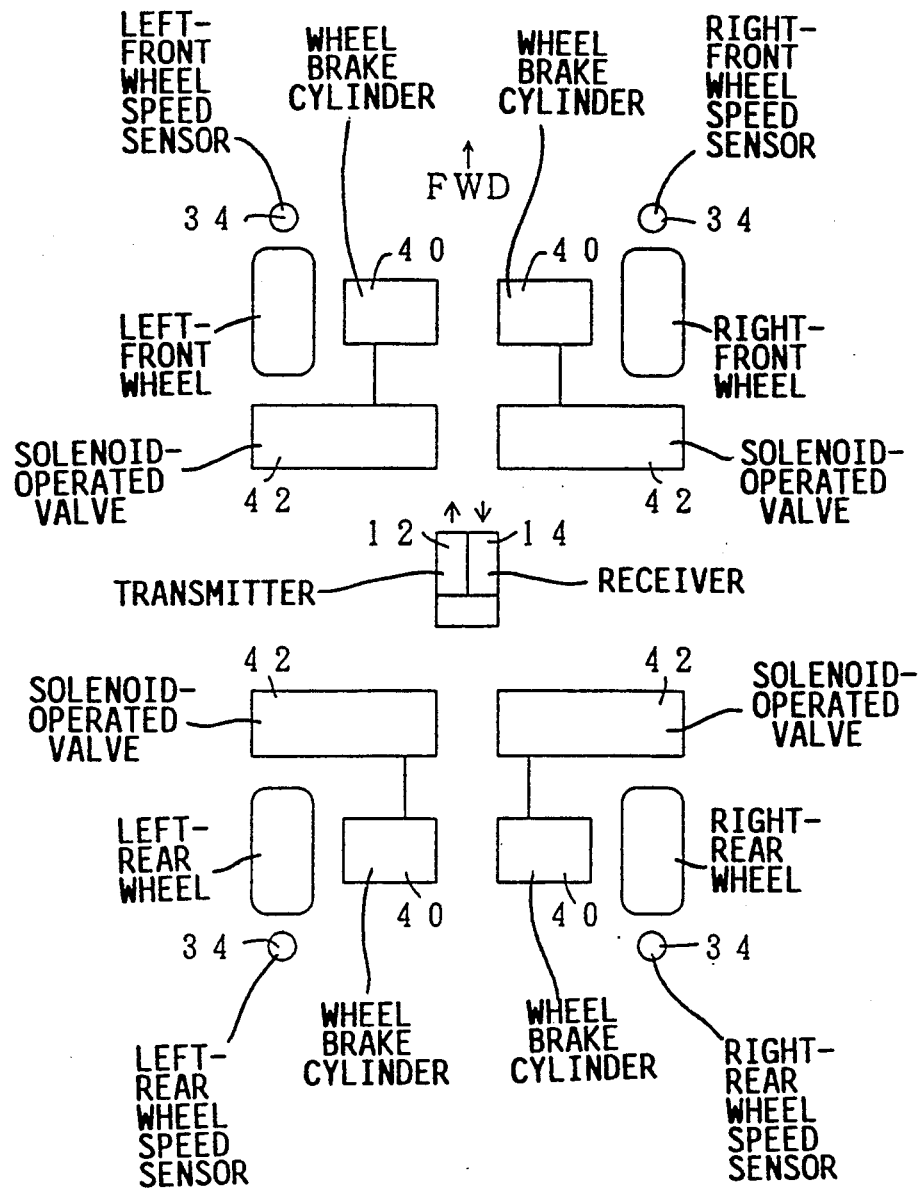
FIG. 3 is an illustration showing the anti-lock brake control device, together with a transmitter and a receiver of the vehicle ground-speed detecting device, in relation to wheels of the vehicle.

Referring first to FIG. 1, there is shown a Doppler-effect vehicle ground-speed detecting apparatus for a motor vehicle. The apparatus includes a Doppler-effect vehicle ground-speed detecting device 10, which has a transmitter 12, a receiver 14, and a ground-speed calculating computer 16. The transmitter and receiver 12, 14, which are also indicated in FIG. 3, are attached to the bottom surface of the vehicle body such that the transmitter and receiver 12, 14 are oriented in the forward running direction of the vehicle, so as to face the road surface at a predetermined acute angle $\theta_0$ (reference angle) relative to the road surface in a plane parallel to the vehicle running direction and perpendicular to the road surface, when the vehicle is parked.

Namely, the transmitter 12 generates a wave in the form of a ultrasonic wave having a predetermined frequency $f_T$ (transmitting frequency), under the control of the computer 16, so that the wave impinges on the road surface at the predetermined reference angle $\theta_0$ with respect to the road surface as viewed in the transverse direction of the vehicle, which is perpendicular to the running direction of the vehicle. A portion of the ultrasonic wave incident upon the road surface and reflected therefrom is received by the receiver 14. The reflected wave is received by the receiver 14 at the predetermined reference angle $\theta_0$. A signal representative of a frequency $f_R$ (receiving frequency) of the wave received by the receiver 14 is sent to the computer 16. The computer 16 calculates a ground-speed "u" of the vehicle, on the basis of the transmitting and receiving frequencies $f_T$ and $f_R$, as discussed below in detail.

Figure 2:
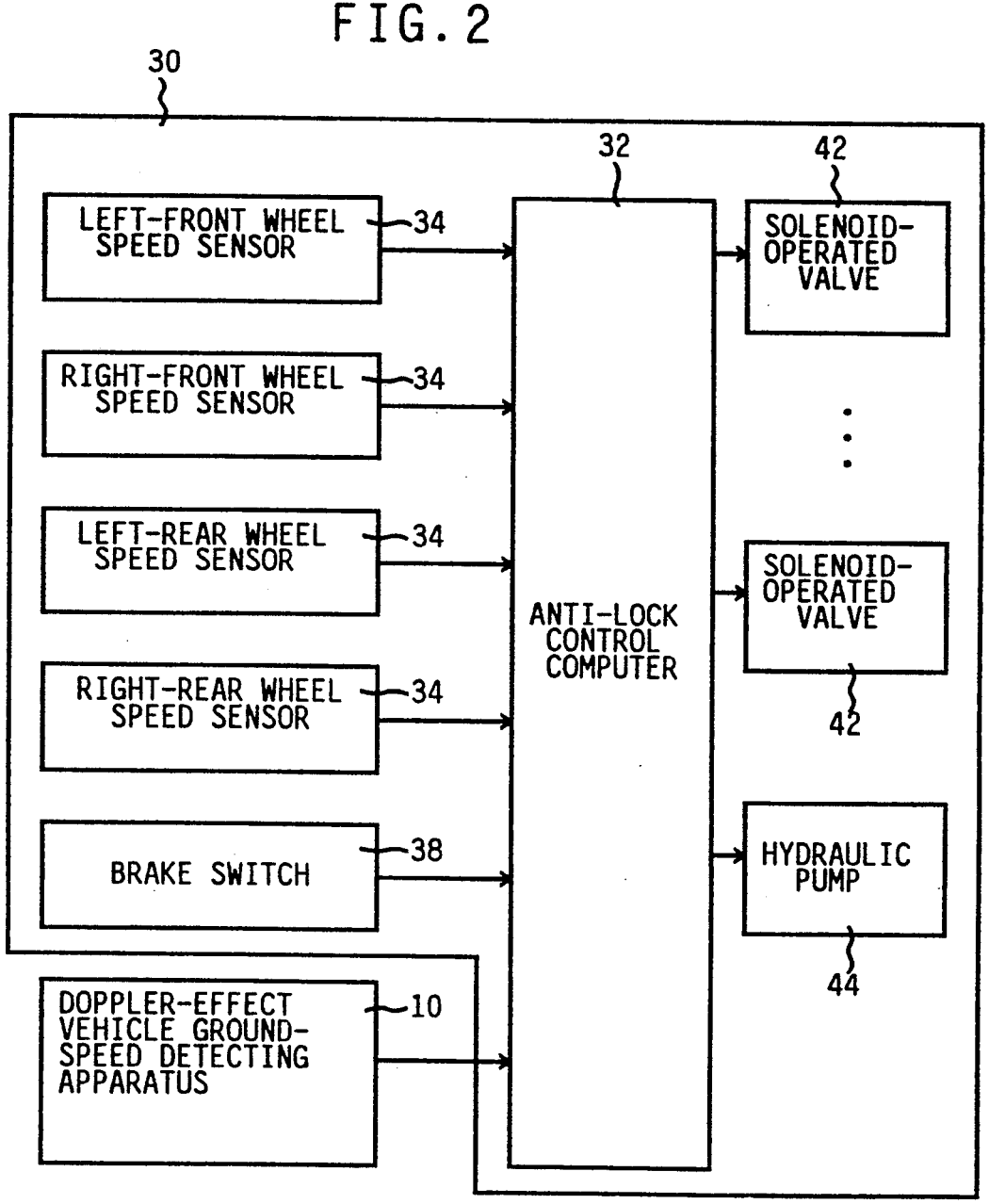
FIG. 2 is a schematic block diagram showing an anti-lock brake control device used with a vehicle ground-speed detecting device of the apparatus of FIG. 1.

The ground-speed calculating computer 16 of the Doppler-effect vehicle ground-speed detecting device 10 is connected to an anti-lock brake control device 30, which includes an anti-lock control computer 32. This computer 32 receives outputs of four wheel speed sensors 34 and an output of a brake switch 38, as indicated in FIGS. 2 and 3. The four wheel speed sensors 34 detect rotating speeds "V" of respective four wheels (left-front wheel, right-front wheel, left-rear wheel and right-rear wheel) of the vehicle as shown in FIG. 3. The output of the brake switch 38 indicates whether a brake pedal is operated or not by the vehicle driver. The anti-lock control computer 32 is adapted to control four solenoid-operated valves 42 for regulating the braking pressures to be applied to respective wheel brake cylinders 40 for the respective four wheels, based on the outputs of the sensors 34, brake switch 38 and Doppler-effect vehicle ground-speed detecting device 10. Each solenoid-operated valve 40 is connected to a master cylinder and a reservoir. The anti-lock control device 32 also controls a hydraulic pump 44, which functions to return a brake fluid to the master cylinder from the reservoir, in which the fluid discharged from each wheel brake cylinder 40 is stored.

As indicated in FIG. 1, the four wheel speed sensors 34 and the brake switch 38 are also connected to the ground-speed calculating computer 16 of the Doppler-effect vehicle ground-speed detecting device 10. The computer 16 calculates the ground-speed "u" of the vehicle, on the basis of the outputs of the sensors 34, brake switch 38 and receiver 14, according to various control programs, which includes a vehicle ground-speed calculating routine as illustrated in the flow chart of FIG. 4.

Referring next to the flow chart of FIG. 4, there will be described the vehicle ground-speed calculating routine.

Figure 4:
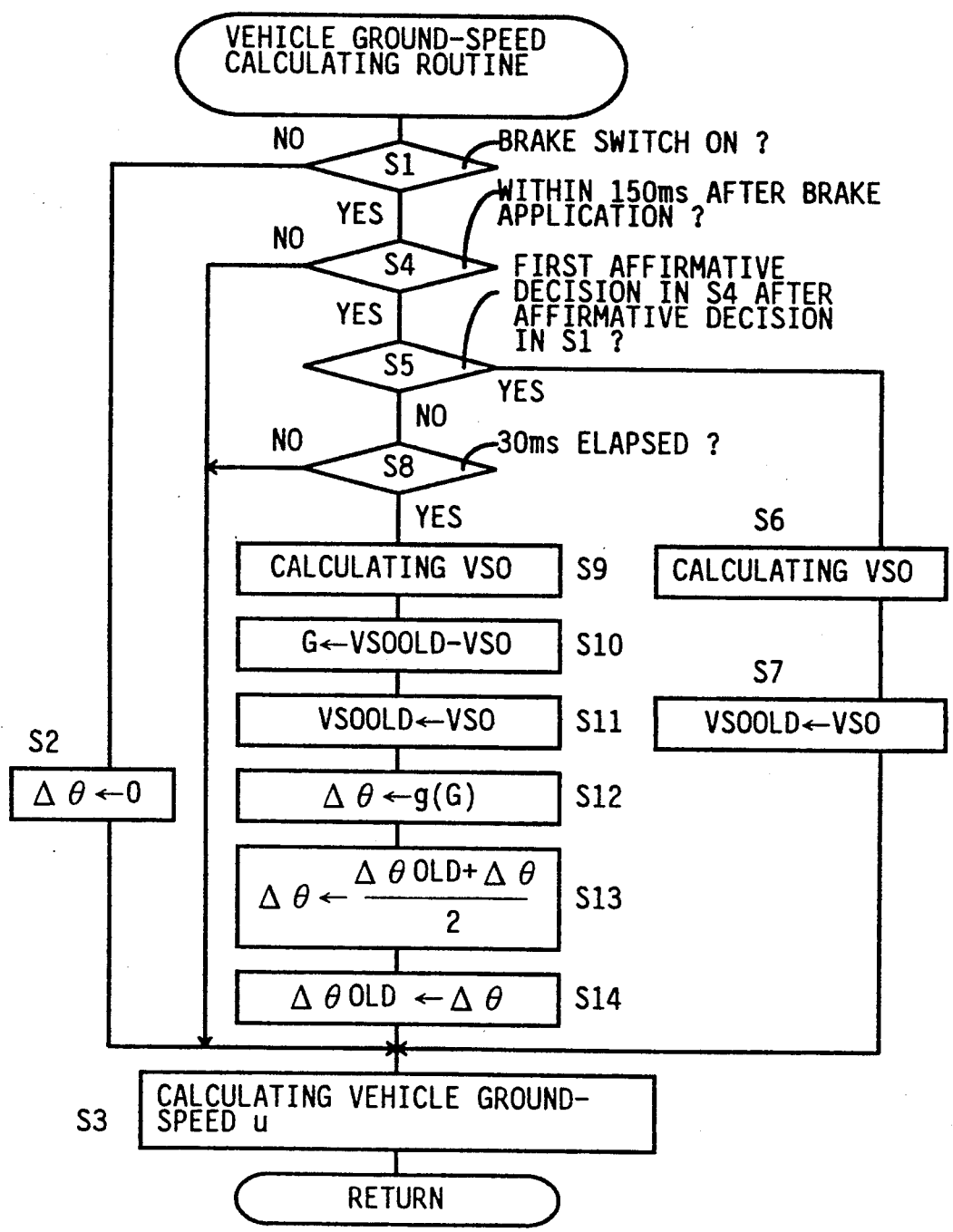
FIG. 4 is a flow chart illustrating a vehicle ground-speed calculating routine executed by the apparatus of FIG. 1.

Briefly, the routine of FIG. 4 is adapted to first determine an amount of change in the actual angle of the vehicle body relative to the road surface, from the reference or nominal angle when the vehicle is parked. This amount of change is determined based on the outputs of the four wheel speed sensors 34, and is used to determine an amount of change $\Delta\theta$ in the transmitting and receiving angle of the transmitter and receiver 12, 14, from the reference angle $\theta_0$ referred to above. A sum of the reference angle $\theta_0$ and the amount of change $\Delta\theta$ represents an actual transmitting and receiving angle $\theta$ of the transmitter and receiver 12, 14 relative to the road surface. Then, the ground-speed "u" of the vehicle is calculated on the basis of the thus obtained angle $\theta$, and the transmitting and receiving frequencies $f_T$, $f_R$ of the transmitter and receiver 12, 14. As well known in the art, the transmitting frequency $f_T$ changes into the receiving frequency $f_R$, due to the Doppler-effect as the ground-speed "u" of the vehicle changes.

Described in more detail, the routine of FIG. 4 is started with step S1 to check to see if the brake switch 38 is in the ON state or not, namely, if a brake is being applied to the vehicle or not. If the brake pedal is not operated, a negative decision (NO) is obtained in step S1, and the control flow goes to step S2 in which the amount of change $\Delta\theta$ in the angle of the transmitter and receiver 14 is set to zero. The signal indicative of the thus determined amount of change $\Delta\theta$ (which is equal to zero) is stored in a random-access memory provided the computer 16. Step S2 is followed by step S3 in which the ground speed "u" of the vehicle is calculated on the basis of the currently stored amount of change $\Delta\theta$ and the transmitting and receiving frequencies $f_T$, $f_R$, and according to the following equation:

$$u=[a\cdot\Delta f]/[(2\cdot f_T+\Delta f)\cdot\cos(\theta_0+\Delta\theta)]$$

where,
a: propagation velocity of the ultrasonic wave
$\Delta f$: Doppler shift $(f_R-f_T)$ The ground-speed "u" of the vehicle thus calculated is stored in the random-access memory in the computer 16. An anti-lock control of the braking pressure for each wheel of the vehicle is effected by the anti-lock control computer 32, based on the ground-speed "u" read out from the computer 16 of the Doppler-effect vehicle ground-speed detecting device 10.

When the brake switch 28 is turned on as a result of depression of the brake pedal, an affirmative decision (YES) is obtained in step S1 and the control flow goes to step S4 and the following steps for: estimating the vehicle speed (obtaining an estimated vehicle speed VSO) on the basis of the speeds V of the four wheels; determining a deceleration value G of the vehicle on the basis of the estimated vehicle speed VSO; determining the amount of change $\Delta\theta$ in the actual angle of the transmitter and receiver 12, 14 on the basis of the deceleration value G; and calculating the ground-speed "u" of the vehicle on the basis of the frequencies $f_T$, $f_R$ and the amount of change $\Delta\theta$.

It is recognized that the estimated vehicle speed VSO is almost equal to the actual ground-speed "u" of the vehicle, during an initial period of 150 ms after the brake pedal is depressed, that is, after the brake switch 38 is turned on and the affirmative decision (YES) is obtained in step S1. During this period, therefore, the deceleration value G of the vehicle can be determined by differentiating the estimated vehicle speed VSO by time. It is also recognized that the actual ground-speed "u" temporarily deviates to a considerable extent from the estimated vehicle speed VSO, for a certain length of time during a period following the initial period of 150 ms, ant that the deceleration value G remains constant during that period following the initial period. Based on the above factual recognition, the amount of change $\Delta\theta$ in the angle $\theta$ of the transmitter 12, 14 is calculated in steps S9-S13 during the initial period of 150 ms following the brake application, but is held constant with the deceleration value G fixed at the value just before the expiration of the initial period of 150 ms.

Described more specifically, step S4 is implemented to determine whether or not the current point of time (at which step S4 is implemented) is within the initial period of 150 ms after the brake switch 38 is turned on. If so, an affirmative decision (YES) is obtained in step S4, and step S5 is implemented to determine whether or not the affirmative decision (YES) is obtained for the first time in step S4 after the affirmative decision (YES) is obtained in step S1. If so, an affirmative decision (YES) is obtained in step S5, and the control flow goes to step S6 in which the estimated vehicle speed VSO is determined based on the rotating speeds V of the four wheels. Step S7 is followed by step S7 in which the calculated estimated speed VSO is stored as VSOOLD, which is used for calculating the deceleration value G in step S10 (which will be described). Step S7 is followed by step S3 wherein the ground-speed "u" of the vehicle is calculated according to the above equation, with the amount of change $\Delta\theta$ being zero (stored in step S2).

In step S6, the highest one of the speeds V of the four wheels is determined as the estimated vehicle speed VSO. After the deceleration value of the wheel whose speed V is the highest exceeds a predetermined upper limit, the speed V corresponding to the upper limit is used as the estimated vehicle speed VSO, as well known in the art.

When step S5 is implemented again, a negative decision (NO) is obtained, and step S8 is implemented to check to see if an incremental time length of 30 ms has elapsed after the brake application. If not, a negative decision (NO) is obtained in step S8, and step S3 is implemented to calculate the ground-speed "u" of the vehicle, based on the amount of change $\Delta\theta=0$.

Then, steps S1, S4, S5, S8 and S3 are repeated implemented. When the time length of 30 ms has elapsed after the brake application, an affirmative decision (YES) is obtained in step S8, and the control flow goes to step S9 to determine the estimated vehicle speed VSO, in the same manner as in step S6 described above. Step S10 is then implemented to calculate the deceleration value G by subtracting the currently determined estimated vehicle speed VSO from the last estimated vehicle speed VSOOLD stored in the computer 16. In the present cycle of execution of the routine in which the affirmative decision (YES) is obtained for the first time in step S8, the last estimated vehicle speed VSOOLD was stored in step S7 described above. Step S10 is followed by step S11 to store the currently determined estimated vehicle speed VSO (obtained in step S9), as the last estimated vehicle speed VSOOLD, which is used in the next implementation of step S10 (in the next cycle of execution of the routine).

Step S12 is then implemented to calculate the amount of change $\Delta\theta$ according to a predetermined function g of the deceleration value G. This function g, which represents a relationship between the deceleration value G and the amount of change $\Delta\theta$ in the angle $\theta$ of the transmitter and receiver 12, 14, is stored in a read-only memory provided in the computer 16. That is, the amount of change $\Delta\theta$ is calculated on the basis of the deceleration value G calculated in step S10 and according to the predetermined relationship represented by the function g. The control flow then goes to step S13 for improving the accuracy of the amount of change $\Delta\theta$. Namely, the currently calculated amount of change $\Delta\theta$ obtained in step S12 is added to the last calculated amount of change $\Delta\theta$OLD, and the sum is divided by 2. In other words, the average value of the two successive values of the amount of change $\Delta\theta$ is obtained in step S13, and this average value $\Delta\theta$ is used in step S3 for calculating the ground-speed "u". The value $\Delta\theta$ obtained in step S13 is stored as the last calculated amount of change $\Delta\theta$OLD, which will be used in the next implementation of step S13. Step S14 is followed by step S3 in which the ground-speed "u" is calculated on the basis of the amount of change $\Delta\theta$ obtained in step S13, and the frequencies $f_T$, $f_R$. As indicated in the above equation, the actual angle $\theta$ of the transmitter and receiver 12, 14 is represented by the sum of the reference angle $\theta_0$ and the calculated amount of change $\Delta\theta$, and this actual angle $\theta$ is used to compensate the ground-speed of the vehicle as obtained based on the Doppler shift, for the deviation of the actual angle $\theta$ from the reference or nominal angle $\theta_0$.

In the subsequent implementations of step S8, the elapse of 30 ms after the last implementation is checked, so that the estimated vehicle speed VSO, deceleration value G and amount of change $\Delta\theta$ are determined or calculated in steps S9, S10 and S13 each time the predetermined incremental time length of 30 ms has elapsed. Thus, the ground-speed "u" is updated. If the initial time period of 150 ms has elapsed after the brake switch 38 is turned on, a negative decision (NO) is obtained in step S4, and step S3 is implemented to calculate the ground-speed "u" using the amount of change $\Delta\theta$ calculated last in step S13 within the initial period of 150 ms.

S1, S4 and S3 are repeatedly implemented until the brake switch 38 is turned off. In step S3 during this period following the initial period of 150 ms, the actual angle $\theta$ is calculated based on the reference angle $\theta_0$ and the amount of change $\Delta\theta$ obtained last in step S13 within the initial period of 150 ms. When the brake switch 38 is turned off, the negative decision (NO) is obtained in step S1, and the amount of change $\Delta\theta$ is reset to zero in step S2, and step S3 is implemented, without compensation of the ground-speed "u" for the deviation of the actual angle r of the transmitter and receiver 12, 14 from the reference angle $\theta_0$. Thus, steps S1, S2 and S3 are repeatedly executed while no brake is applied to the vehicle.

It will be understood from the above description of the present embodiment that while the vehicle is braked, the amount of change $\Delta\theta$ in the transmitting and receiving angle $\theta$ of the transmitter and receiver 12, 14 is calculated or estimated from the deceleration value G of the vehicle, and the ground-speed "u" of the vehicle is calculated on the basis of the calculated amount of change $\Delta\theta$ as well as the transmitting and receiving frequencies $f_T$ and $f_R$ of the ultrasonic wave as transmitted from and received by the transmitter and receiver 12, 14, respectively. Accordingly, the ground-speed "u" used for controlling the braking pressure applied to each wheel of the vehicle in the anti-lock manner can be obtained with high precision, without being affected by the brake dive of the vehicle body, which changes the angle $\theta$ of the transmitter and receiver 12, 14.

It is noted that the wheel speed sensors 34 provided for the anti-lock control device 30 are utilized for accurately detecting the vehicle ground-speed "u", namely, for determining the deceleration value G of the vehicle as a parameter representing the amount of change $\Delta\theta$, i.e., the actual angle $\theta$ of the transmitter and receiver 12, 14. Consequently, the Doppler-effect vehicle ground-speed detecting device 10 does not require exclusive wheel speed sensors and is available at an accordingly reduced cost.

It will be understood that steps S1 and S4–S11 correspond to acceleration-deceleration calculating means for calculating an acceleration or a deceleration value of the vehicle body, on the basis of the output of the wheel speed sensors 34, while steps S2, S3 and S12–S14 correspond to ground-speed determining means for determining the ground-speed "u" of the vehicle, on the basis of the angle $\theta$ of the transmitter and receiver 12, 14 relative to the road surface in the plane parallel to the running direction of the vehicle and perpendicular to the road surface, as well as on the basis of the transmitting and receiving frequencies $f_T$ and $f_R$ of the transmitter 12 and receiver 14.

Figure 5:
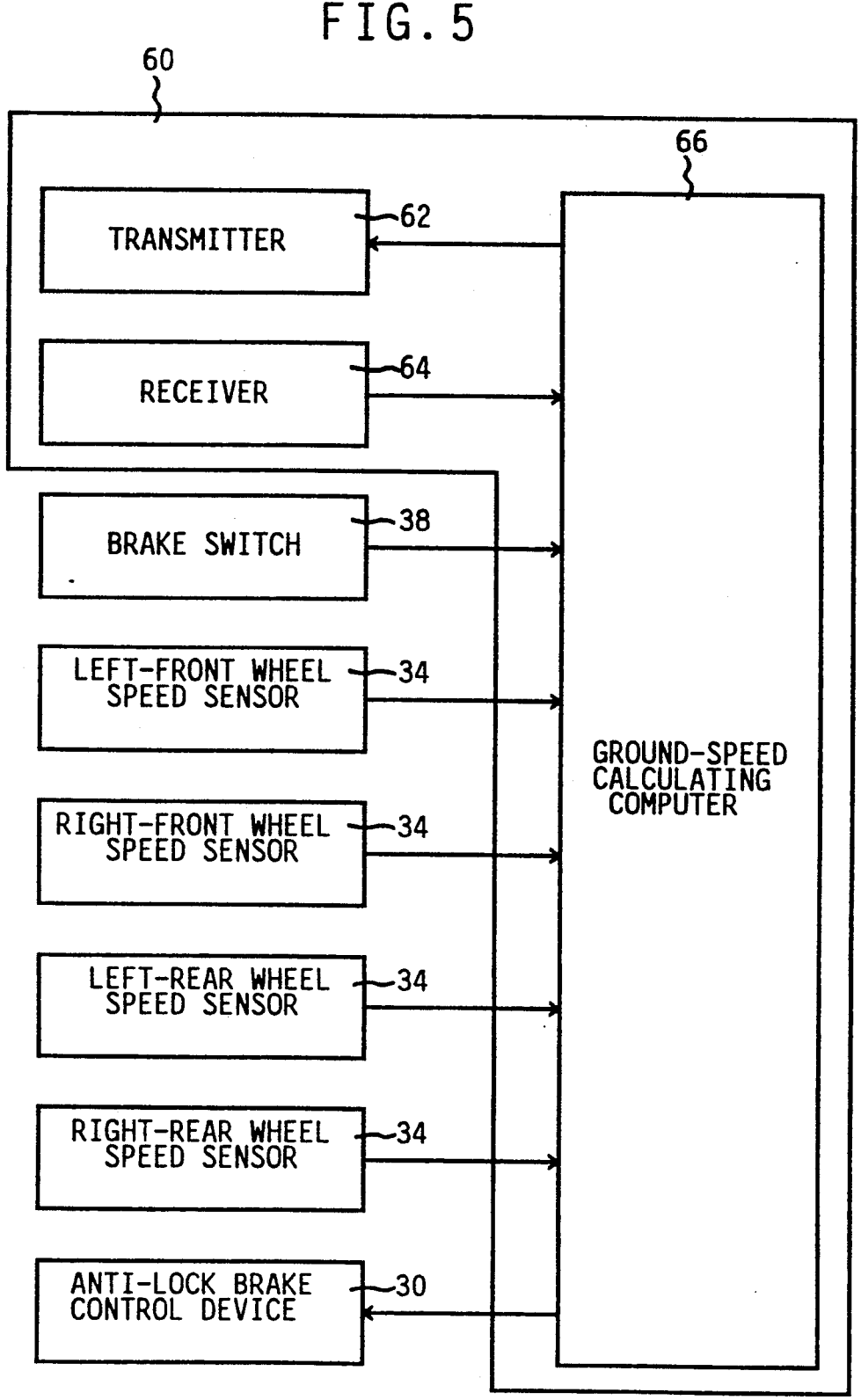
FIG. 5 is a schematic block diagram showing a second embodiment of the vehicle ground-speed detecting apparatus of this invention.

Referring next to FIG. 5, there will be described a second embodiment of this invention, which uses a Doppler-effect vehicle ground-speed detecting device 60. Like the device 10 of the first embodiment of FIG. 1, this device 60 includes a transmitter 62, a receiver 64, and a ground-speed calculating computer 66 which receives the outputs of the four wheel speed sensors 34 and brake switch 38. The signal indicative of the ground-speed "u" calculated by the computer 66 is sent to the anti-lock control device 30.

Unlike the transmitter and receiver 12, 14 used in the first embodiment, the transmitter and receiver 62, 64 are attached to the vehicle body such that these elements 62, 64 are oriented in the backward direction of the vehicle, so that the ultrasonic wave generated by the transmitter 12 impinges the road surface at the predetermined reference angle $\theta$ (actuate angle) relative to the road surface, and the wave reflected by the road surface is incident upon the receiver 64 at the reference angle $\theta$ relative to the road surface.

Figure 6:
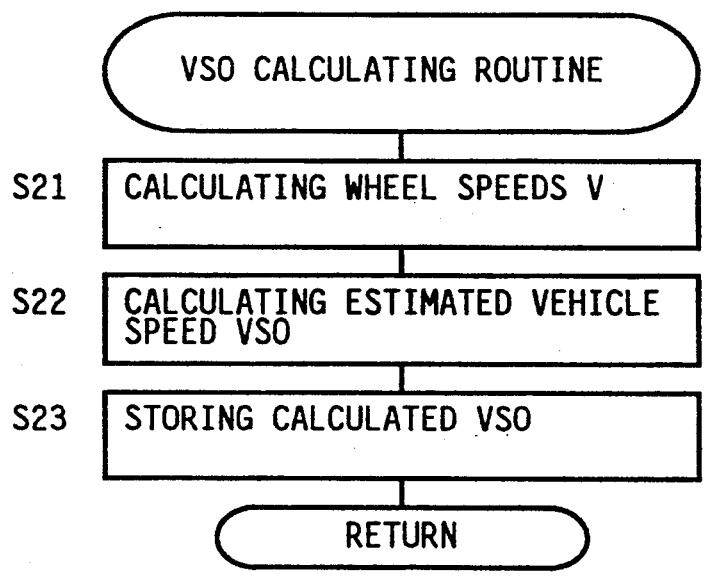
FIG. 6 is a flow chart illustrating a routine for calculating an estimated vehicle speed VSO, used in the embodiment of FIG. 5.
Figure 7:
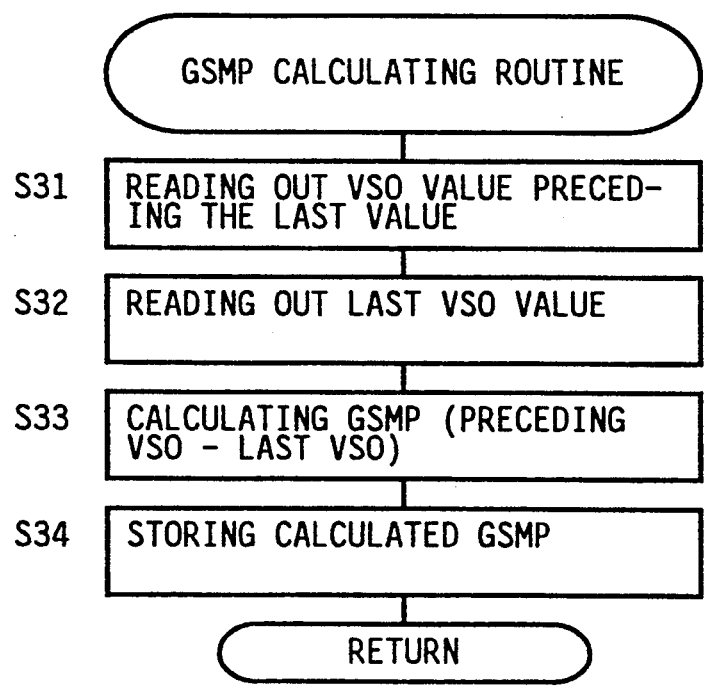
FIG. 7 is a flow chart illustrating a routine for calculating a sampling deceleration value GSMP, on the basis of the estimated vehicle speed VSO.
Figure 8:
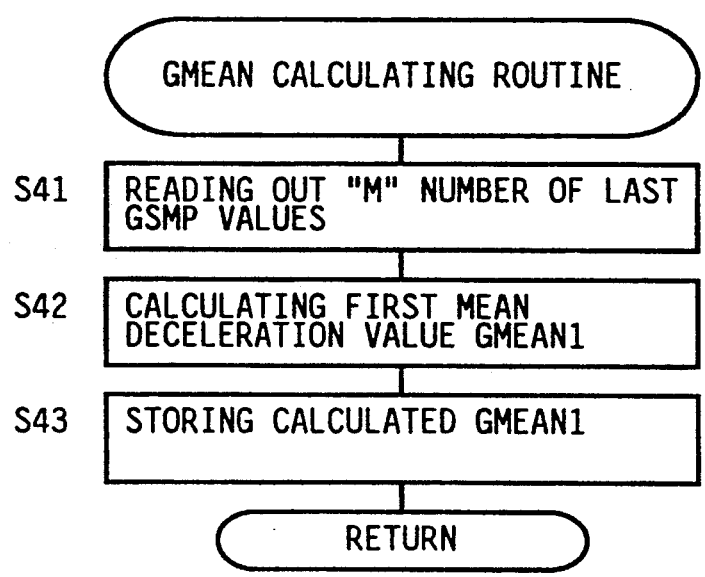
FIG. 8 is a flow chart illustrating a routine for calculating a first mean deceleration value GMEAN1, on the basis of the sampling deceleration value GSMP.
Figure 9:
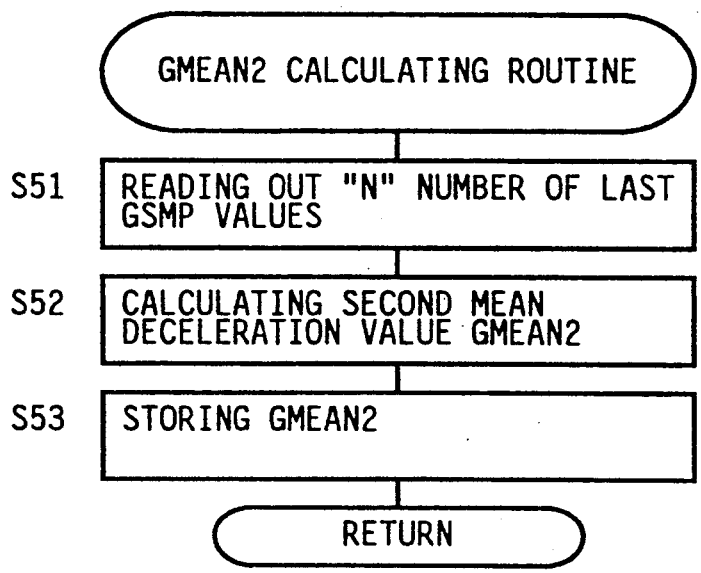
FIG. 9 is a flow chart illustrating a routine for calculating a second means deceleration value GMEAN2, on the basis of the sampling deceleration value GSMP.
Figure 10:
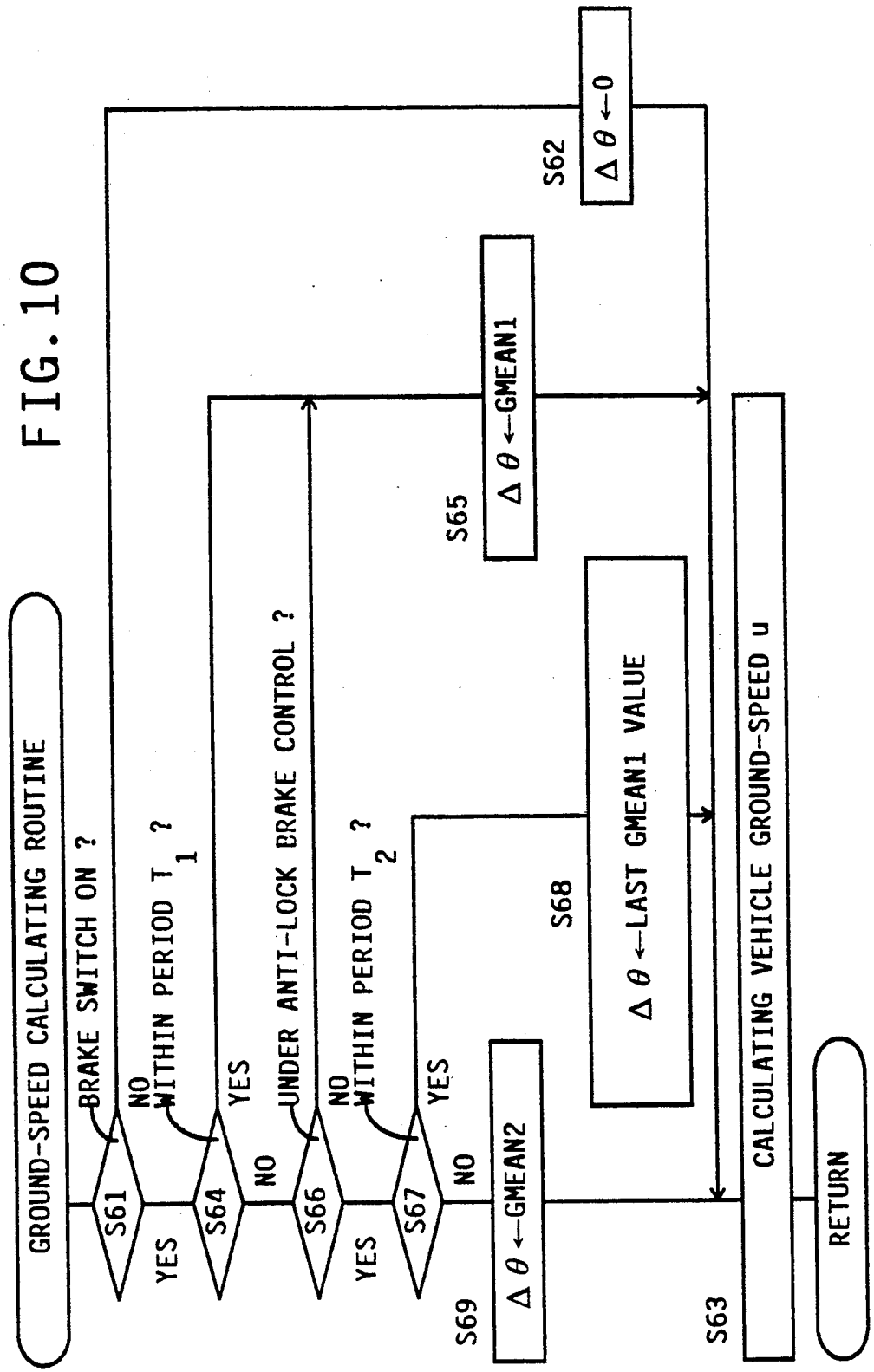
FIG. 10 is a flow chart illustrating a vehicle ground-speed calculating routine executed by the apparatus of FIG. 5.

The ground-speed calculating computer 66 has a read-only memory which stores various control programs, including: a VSO calculating routine of FIG. 6 for obtaining the estimated vehicle speed VSO; a routine of FIG. 7 for calculating a sampling deceleration value GSMP; a routine of FIG. 8 for calculating a first mean deceleration value GMEAN1; a routine of FIG. 9 for calculating a second mean deceleration value GMEAN2; and a routine of FIG. 10 for calculating the ground-speed "u" of the vehicle. These routines are executed at a predetermined time interval, to calculate the ground-speed "u" of the vehicle.

The VSO calculating routine illustrated in the flow chart of FIG. 6 is started with step S21 for calculating the rotating speeds V of the vehicle wheels on the basis of the outputs of the wheel speed sensors 34. Step S21 is followed by step S22 to determine the estimated vehicle speed VSO in the same manner as in steps S6 and S9 of the flow chart of FIG. 4. Step S23 is then implemented to store the determined estimated vehicle speed VSO in a random-access memory of the computer 66. Steps S21–S23 are repeatedly implemented to store the estimated vehicle speed values VSO at the predetermined cycle time.

The GSMP calculating routine illustrated in the flow chart of FIG. 7 is started with step S31 to read out the estimated vehicle speed value VSO preceding the one which has been stored last in step S23. Step S31 is followed by step S32 to read out the estimated vehicle speed value VSO which has been stored last in step S23. Namely, steps S31 and S32 are implemented to read out the last two values of the estimated vehicle speed VSO. The control flow then goes to step S33 to calculate a sampling deceleration value G of the vehicle by subtracting the last value VSO from the preceding value VSO. Step S33 is followed by step S34 to store the calculated sampling deceleration value G in the random-access memory of the computer 66. Steps S31–S34 are repeatedly implemented to store the deceleration values G, which are sampled at the predetermined cycle time.

The GMEAN1 calculating routine illustrated in the flow chart of FIG. 8 is started with step S41 to read out a predetermined number "M" of the successive sampling deceleration values GSMP. Step S41 is followed by step S42 to calculate, as the first mean deceleration value GMEAN1, an average of the predetermined number "M" of the successive sampling deceleration values GSMP read out in step S41. Step S43 is then implemented to store the calculated first mean deceleration value GMEAN1 in the random-access memory of the computer 16. Steps S41–S43 are repeatedly implemented to store the first mean deceleration values GMEAN1 at the predetermined cycle time. It is noted that the number "M" of the successive sampling deceleration values GSMP read out in step S41 is determined so that these values GSMP are obtained during a time period of 20–30 ms, for example.

The GMEAN2 calculating routine illustrated in the flow char of FIG. 9 is started with step S51 to read out a predetermined number "N" of the successive sampling deceleration values GSMP. The number "N" is larger than the number "M". Step S51 is followed by step S52 to calculate, as the second means deceleration value GMEAN2, an average of the predetermined number "N" of the successive sampling deceleration values GSMP read out in step S51. Step S53 is then implemented to store the calculated second mean deceleration value GMEAN2 in the random-access memory of the computer 16. Steps S51–S53 are repeatedly implemented to store the second means deceleration values GMEAN2 at the predetermined cycle time. It is noted that the number "N" of the successive sampling deceleration values GSMP read out in step S51 is determined so that these values GSMP are obtained during a time period of 100–500 ms, for example.

The ground-speed calculating routine illustrated in the flow chart of FIG. 10 is adapted to: zero the amount of change $\Delta\theta$ in the angle of the transmitter and receiver 12, 14 while no brake is applied to the vehicle; calculate the amount of change $\Delta\theta$ on the basis of the first mean deceleration value GMEAN1 while brake is applied to the vehicle but before the braking pressure is controlled in the anti-lock control manner; and (a) obtain the amount of change $\Delta\theta$ on the basis of the first mean deceleration value GMEAN1, during a first period of time between the commencement of the anti-lock control of the braking pressure and the expiration of a predetermined first time $T_1$ after the brake application, (b) obtain the amount of change $\Delta\theta$ on the basis of the first mean deceleration GMEAN1 which is obtained last within the above first period of time, during a second period of time between the expiration of the first time $T_1$ and the expiration of a predetermined second time $T_2$ after the expiration of the first time $t_1$, and obtain the amount of change $\Delta\theta$ on the basis of the second means deceleration value GMEAN2, during a third period of time between the expiration of the second time $T_2$ and the termination of the anti-lock control of the braking pressure. The routine of FIG. 10 is also adapted such that the ground-speed "u" of the vehicle is calculated according to the following equation, and on the basis of the amount of change $\Delta\theta$ obtained as described above, the reference angle $\theta_0$ of the transmitter and receiver 12, 14, and the transmitting and receiving frequencies $f_T$ and $f_R$.

$$u = [a \cdot \Delta f]/[(2 \cdot f_T + \Delta f) \cdot \cos(\theta_0 - \Delta\theta)]$$

where,
a: propagation velocity of the ultrasonic wave
$\Delta f$: Doppler shift $(f_T - f_R)$ It is noted that the first time $T_1$ is determined so that it expires when the estimated vehicle speed VSO which has decreased begins to increase as a result of the anti-lock control of the braking pressure. For example, the first time $T_1$ is selected within a range of 400–700 ms. It is also noted that the second time $T_2$ is determined so that it expires when the estimated vehicle speed VSO which has increased begins to decrease again, following the ground-speed "u" of the vehicle, also as a result of the anti-lock control of the braking pressure. For example, the first time $T_2$ is selected within a range of 400–700 ms.

The ground-speed calculating routine will be described in detail, by reference to the flow chart of FIG. 10.

While no brake is applied to the vehicle, that is, while the brake switch 38 is off, a negative decision (NO) is obtained in step S61, whereby step S62 is implemented to zero the amount of change $\Delta\theta$. Step S62 is followed by step S63 in which the ground-speed "u" of the vehicle is calculated based on the amount of change $\Delta\theta = 0$.

While brake is applied to the vehicle but the braking pressure is not controlled in the anti-lock control manner, an affirmative decision (YES) is obtained in step S61, and step S64 is implemented to check to see if the current point of time is within the first time T1 (corresponding to the period I shown in FIG. 16) after the brake application. If so, an affirmative decision (YES) is obtained in step S64, and step S65 is implemented to read out the last calculated first mean deceleration value GMEAN1, and calculate the amount of change $\Delta\theta$ on the basis of this value GMEAN1, and according to a predetermined relationship between the deceleration value of the vehicle and the amount of change $\Delta\theta$ (angle $\theta$). This relationship, which is determined by experiments, is stored in the read-only memory of the computer 66. Step S63 is then implemented to calculate the ground-speed "u", using the calculated amount of change $\Delta\theta$.

As steps S61, S64, S65 and S63 repeatedly implemented, the first time $T_1$ has expired and a negative decision (NO) is obtained in step S64, whereby step S66 is implemented to check to see if the braking pressure is controlled in the anti-lock control manner. Since the braking pressure is not controlled in the anti-lock control manner because the braking condition does not require the anti-lock control of the braking pressure, a negative decision (NO) is obtained in step S66, and step S65 described above is implemented to calculate the amount of change $\Delta\theta$ on the basis of the first mean deceleration value GMEAN1.

Figure 16:
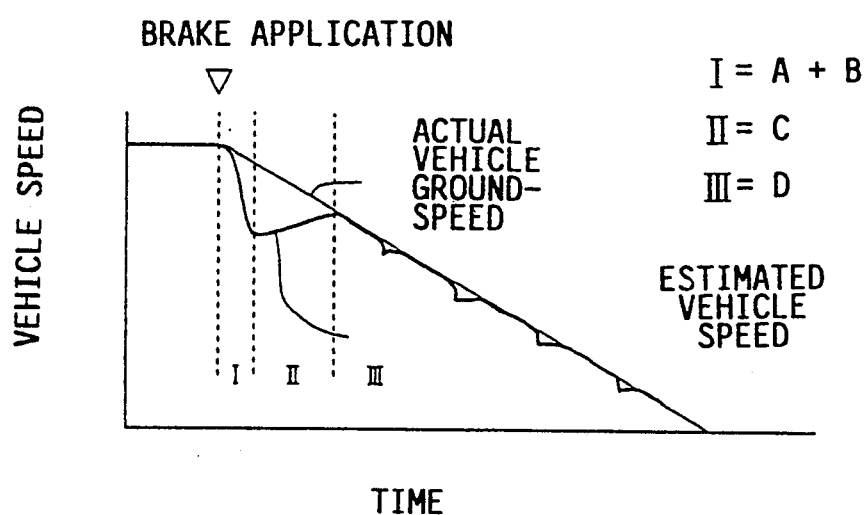
FIG. 16 is a graph depicting a relationship between an estimated vehicle speed and an actual vehicle speed, when brake is applied to the vehicle.

In the case where the braking condition requires the braking pressure to be controlled in the anti-lock control mode, step S64 is followed by step S65 until the first time $T_1$ expires, that is, during the first period of time indicated at I in FIG. 16. Accordingly, the amount of change $\Delta\theta$ is calculated based on the first mean deceleration value GMEAN1. When the first time $T_1$ has expired, step S64 is followed by step S66 to determine whether or not the braking pressure is controlled in the anti-lock control control manner, i.e., whether or not the anti-lock control mode has been established.

Before the anti-lock control mode has been established, step S66 is followed by step S65 even after the first time $T_1$ has expired. In this case, too, step S65 is implemented to calculate the amount of change $\Delta\theta$ based on the first mean deceleration value GMEAN1. The anti-lock control mode may be established either before or after the first time $T_1$ has expired. In the former case, an affirmative decision (YES) is obtained in step S66 after the first time $T_1$ has expired. In the latter case, the affirmative decision (YES) is obtained in step S66 after repeated execution of steps S61, S64, S66, S65 and S63. In either case, step S66 is followed by step S67 to check to see if the current point of time is within the second time $T_2$ after the expiration of the first time $T_1$, namely, within the second period of time between the expiration of the first period of time ($T_1$) and the expiration of the second time $T_2$. This second period of time corresponds to the period II indicated in FIG. 16. If the second time $T_2$ has not expired, an affirmative decision (YES) is obtained, and the control flow goes to step S68 in which the amount of change $\Delta\theta$ is determined based on the first mean deceleration value GMEAN1 which was used last in step S65 within the first period of time (first time $T_1$). Step S68 is followed by step S63 to calculate the ground-speed "u" based on the amount of change $\Delta\theta$ determined in step S68.

Steps S61, S64, S66, S67, S68 and S63 are repeatedly implemented until the second time $T_2$ has expired. During this second time period, the amount of change $\Delta\theta$ is determined based on the same first deceleration value GMEAN1 which was used last in step S65 within the first period (first time $T_1$).

When the second time $T_2$ has expired as a result of the repeated implementation of steps S61, S64, S66–S68 and S63, a negative decision (NO) is obtained in step S67, and the control flow goes to step S69 to read out the second mean deceleration value GMEAN2 which was calculated in the last implementation of step S52, and determine the amount of change $\Delta\theta$ on the basis of this second means deceleration value GMEAN2, and according to a predetermined relationship between the value GMEAN2 and the amount of change $\Delta\theta$. This relationship is also stored in the read-only memory of the computer 66. Step S69 is followed by step S63 in which the ground-speed "u" of the vehicle is calculated based on the amount of change $\Delta\theta$ determined in step S69. Thus, during the third period of time (corresponding to the period III indicated in FIG. 16) following the second period $T_2$, the ground-speed "u" is calculated based on the amount of change $\Delta\theta$ determined based on the second mean deceleration value GMEAN2.

It will be understood from the above description of the second embodiment that the first mean deceleration value GMEAN 1 which is an average of a relatively small number (=M) of successive sampling deceleration values GSMP is used during the initial period I (FIG. 16) after the brake switch 38 is turned on. Namely, the number "M" used in step S42 to calculate the first mean deceleration value GMEAN1 is smaller than the number "N" used in step S52 to calculate the second mean deceleration value GMEAN2. Accordingly, the first mean deceleration value GMEAN1 has a better response to the change in the actual deceleration of the vehicle, whereby the ground-speed "u" can be detected with higher accuracy. This improvement in the accuracy of detection of the ground-speed "u" results in improvement in the accuracy of determination by the anti-lock control device 30 as to whether the braking pressure should be controlled (reduced and increased) in the anti-lock control mode so as to prevent an excessive slip of the wheel on the road surface.

Usually, the determination as to whether the anti-lock control of the braking pressure should be started is effected by determining whether or not the rotating speed V of the wheel in question is considerably lower than the ground-speed "u" of the vehicle. On the other hand, the ground-speed "u" detected by the conventional Doppler-effect vehicle ground-speed detecting apparatus tends to deviate from the actual ground speed of the vehicle when brake is applied to the vehicle. For example, where the transmitter 62 is oriented in the backward direction of the vehicle so as to face the road surface at the nominal acute angle $\theta_0$, the actual angle of the transmitter 62 becomes smaller than the nominal angle $\theta_0$ since the braking causes the vehicle body to be inclined such that the front portion of the vehicle body is lower than the rear portion. This phenomenon of pitching of the vehicle body is referred to as "brake dive" of the vehicle. The brake dive results in starting the anti-lock control of the braking pressure even when the the difference between the actual and detected ground-speeds of the vehicle is not excessive, namely, even when the amount of slip of the wheel is not excessive. According to the Doppler-effect vehicle ground-speed detecting apparatus of the present embodiment, the ground-speed "u" is calculated with high accuracy, during the initial period $T_1$, based on the first mean deceleration value GMEAN1 having a higher response to the actual vehicle deceleration than the second mean deceleration value GMEAN2. Therefore, the present arrangement eliminates unnecessary anti-lock control operations of the braking pressure which take place due to the brake dive of the vehicle where the conventional detecting apparatus is used.

The present embodiment is further advantageous during the second period $T_2$ following the initial period $T_1$. In this second period, the estimated vehicle speed VSO increases due to the effect of the anti-lock control of the braking pressure. However, the estimated vehicle speed VSO which increases during the second period is not used to calculate the deceleration value G (GMEAN1) of the vehicle used for calculating the amount of change $\Delta\theta$ of the angle $\theta$ of the transmitter and receiver 12, 14. In the second period, the deceleration value G (GMEAN1) is fixed at the value which is calculated last in the initial period. Hence, the accuracy of calculation of the deceleration value G during the second period is improved, and the accuracy of calculation of the ground-speed "u" is accordingly improved.

In the third period wherein the estimated vehicle speed VSO decreases substantially following the actual speed also due to the effect of the anti-lock control of the braking pressure, the second mean deceleration value GMEAN2 is used to calculate the amount of change $\Delta\theta$. Since the number "N" of the sampling deceleration values GSMP used to obtain the second mean deceleration value GMEAN2 is larger than the number "M" of the sampling deceleration values GSMP used to obtain the first mean deceleration value GMEAN1, the second means deceleration value GMEAN2 represents the actual deceleration value G with higher precision than the first mean deceleration value GMEAN1. Accordingly, the accuracy of calculation of the ground-speed "u" during the third period is also improved.

It will be understood that the VSO calculating routine of FIG. 6 corresponds to vehicle-speed estimating means for obtaining an estimated speed of the vehicle, on the basis of the rotating speeds of the wheels, while the GSMP calculating routine of FIG. 7 corresponds to sampling means for obtaining samples of the acceleration or deceleration value of the vehicle body. Further, the routines of FIGS. 8 and 9 and steps S61, S64–S67 and S69 of the routine of FIG. 10 correspond to deceleration determining means for obtaining the first and second mean acceleration or deceleration values on the basis of the sampling deceleration values GSMP. The vehicle-speed estimating means, sampling means and deceleration determining means cooperate to constitute deceleration obtaining means for obtaining the deceleration value of the vehicle, which represents the angle of the transmitter and receiver 12, 14. Further, steps S62, S63, S65, S68 and S69 of the routine of FIG. 10 correspond to ground-speed determining means for determining the ground-speed "u" of the vehicle on the basis of the angle of the transmitter and receiver as well as the transmitting and receiving frequencies $f_T$, $f_R$ of the transmitter and receiver.

A third embodiment of this invention will be described by reference to the flow chart of FIG. 11, which shows the ground-speed calculating routine used in place of the routine of FIG. 10. The routine of FIG. 11 is also stored in the read-only memory of the ground-speed calculating computer 66 of FIG. 5.

Figure 11:
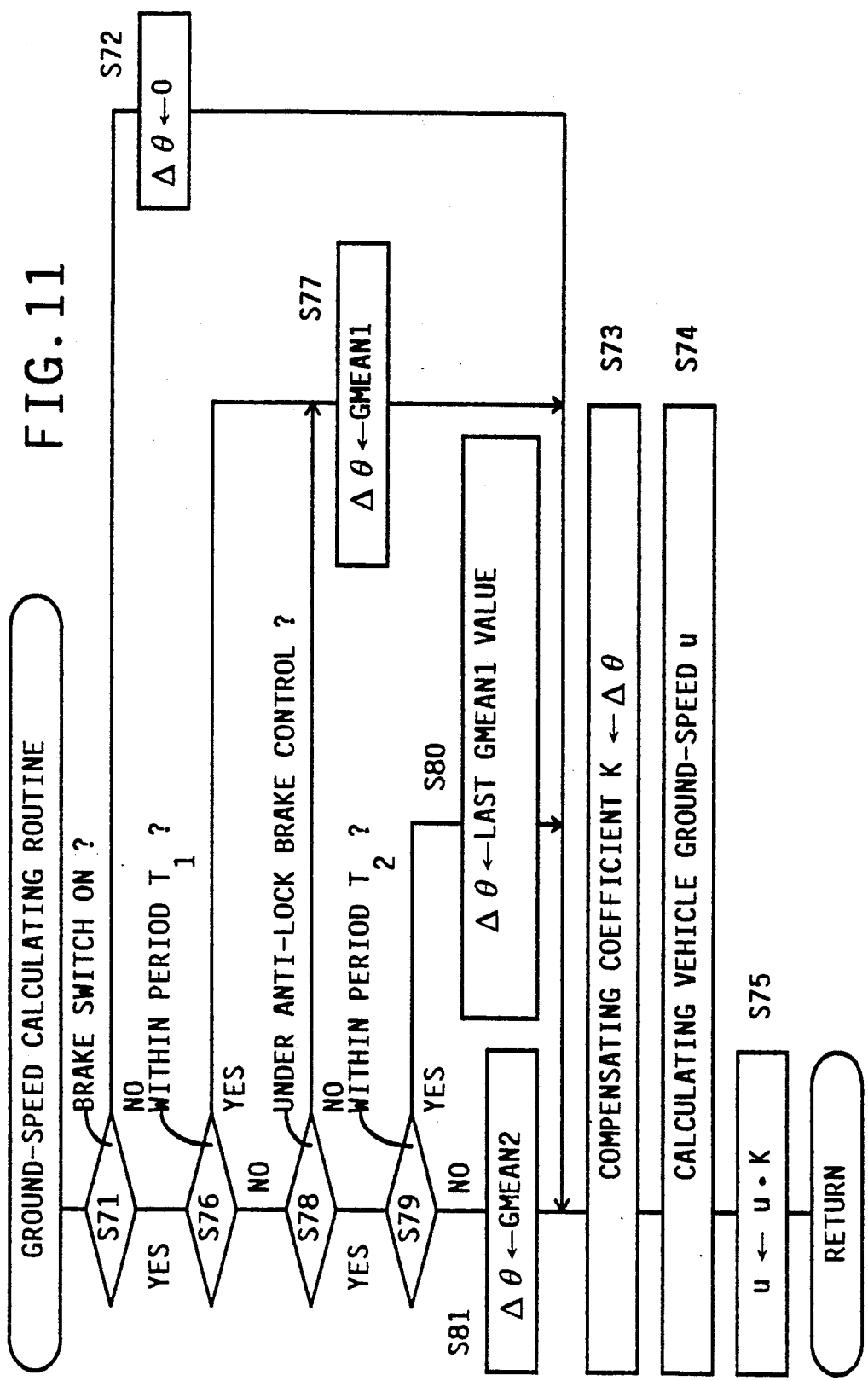
FIG. 11 is a flow chart corresponding to that of FIG. 10, illustrating a vehicle ground-speed calculating routine according to a third embodiment of the invention.

According to the routine of FIG. 11, the amount of change $\Delta\theta$ is calculated according to the same rules as in the routine of FIG. 10, depending upon the time of execution of the relevant steps after the brake switch 38 is turned on. Unlike the preceding second embodiment wherein the actual angle $\theta$ is first obtained from the calculated amount of change $\Delta\theta$ and the reference angle $\Delta_0$ to calculate the ground-speed "u", the present third embodiment of FIG. 11 is adapted to first calculate the ground-speed "u" based on the reference angle $\theta_0$, and then adjust or compensate the calculated ground-speed "u" by a compensating coefficient K which varies with the calculated amount of change $\Delta\theta$.

Described more specifically, steps S71, S72 and S76–S81 corresponding to steps S61, S62 and S64–S69 are implemented to calculate the amount of change $\Delta\theta$. Steps S72, S77, S80 and S81 are followed by step S73 in which the compensating coefficient K is determined on the basis of the calculated amount of change $\Delta\theta$, and according to a predetermined relationship between the amount of change $\Delta\theta$ and the compensating coefficient K. This relationship, which is determined by experiments, is stored in the read-only memory of the computer 66. Step S74 is followed by step S74 to calculate the ground-speed "u" of the vehicle on the basis of the reference angle $\theta_0$ and the transmitting and receiving frequencies $f_R$, $f_T$, without taking the amount of change $\Delta\theta$ into account. Then, the control flow goes to step S75 in which the ground-speed "u" calculated in step S74 is multiplied by the compensating coefficient K determined in step S73.

In the present third embodiment, the routine of FIG. 6 corresponds to the vehicle-speed estimating means, while the routine of FIG. 7 corresponds to the sampling means. Further, the routines of FIGS. 8 and 9 and steps S71, S76–S79 and S81 of the routine of FIG. 11 correspond to the deceleration calculating means. These vehicle-speed estimating means, sampling means and deceleration calculating means cooperate to constitute the deceleration obtaining means for obtaining deceleration value of the vehicle body. Further, steps S72–S75, S77, S80 and S81 of the routine of FIG. 11 correspond to the ground-speed determining means, which includes compensating-value calculating means (S73) for calculating the compensating value (K) based on the deceleration value calculated by the deceleration calculating means, and further includes compensating means (S75) for compensating the ground-speed of the vehicle by the compensating value.

Although the third embodiment is adapted to compensate the ground-speed by multiplying the ground-speed (calculated in step S74) by the compensating coefficient K (determined in step S73), this coefficient K may be replaced by any compensating value which is suitably determined on the basis of the deceleration value of the vehicle and which is used in step S75 to adjust the ground-speed, by addition or subtraction rather than multiplication.

In the second and third embodiments of FIGS. 10 and 11, the first time $T_1$ is determined such that it expires when the estimated vehicle speed VSO which has decreased begins to increase as a result of the anti-lock control of the braking pressure. In other words, step S64, S76 functions to indirectly determine whether the estimated vehicle speed VSO is in the process of increasing, that is, whether the current point of time is within the second period II of FIG. 16. This indirect determination may be replaced by a direct determination as to whether the rate of increase in the estimated vehicle speed VSO has changed from a negative value to a positive value, i.e., has become larger than zero. In this case, the amount of change $\Delta\theta$ just before the rate of increase in the estimated vehicle speed VSO has been zeroed is used for calculating the deceleration value G of the vehicle, after the rate of increase has become larger than zero.

Also, the second time $T_2$ is determined such that it expires when the estimated vehicle speed VSO begins to decrease with the actual ground speed of the vehicle. In other words, step S67, S79 functions to indirectly determine whether the estimated vehicle speed VSO is in the process of decreasing with the actual ground-speed, that is, whether the current point of time is within the third period III of FIG. 16. This indirect determination in step S67, S79 may be replaced by a direct determination as to whether the rate of increase in the estimated vehicle speed VSO has changed from a positive value to a negative value.

In the second and third embodiments, the amount of change $\Delta\theta$ is fixed only after the first time $T_1$ has expired, namely, only after the estimated vehicle speed VSO has begun to increase. However, the amount of change $\Delta\theta$ may be fixed even before the first time $T_1$ has expired, provided that the anti-lock control has been started. After the anti-lock control is started, the rate of increase in the estimated vehicle speed VSO is a negative value close to zero, and the second period II of FIG. 16 will begin in a short time.

The routine of FIG. 6 is stored in the read-only memory of the ground-speed calculating computer 66, it may be stored in a read-only memory of the anti-lock control computer 32.

In the third period III of FIG. 16, the sampling deceleration values GSMP are calculated on the basis of the estimated vehicle speed VSO according to the routine of FIG. 7. However, the sampling deceleration values GSMP may be calculated on the basis of the ground-speed "u" which is calculated based on the reference angle 8° as in step S74 of FIG. 11.

Figure 12:
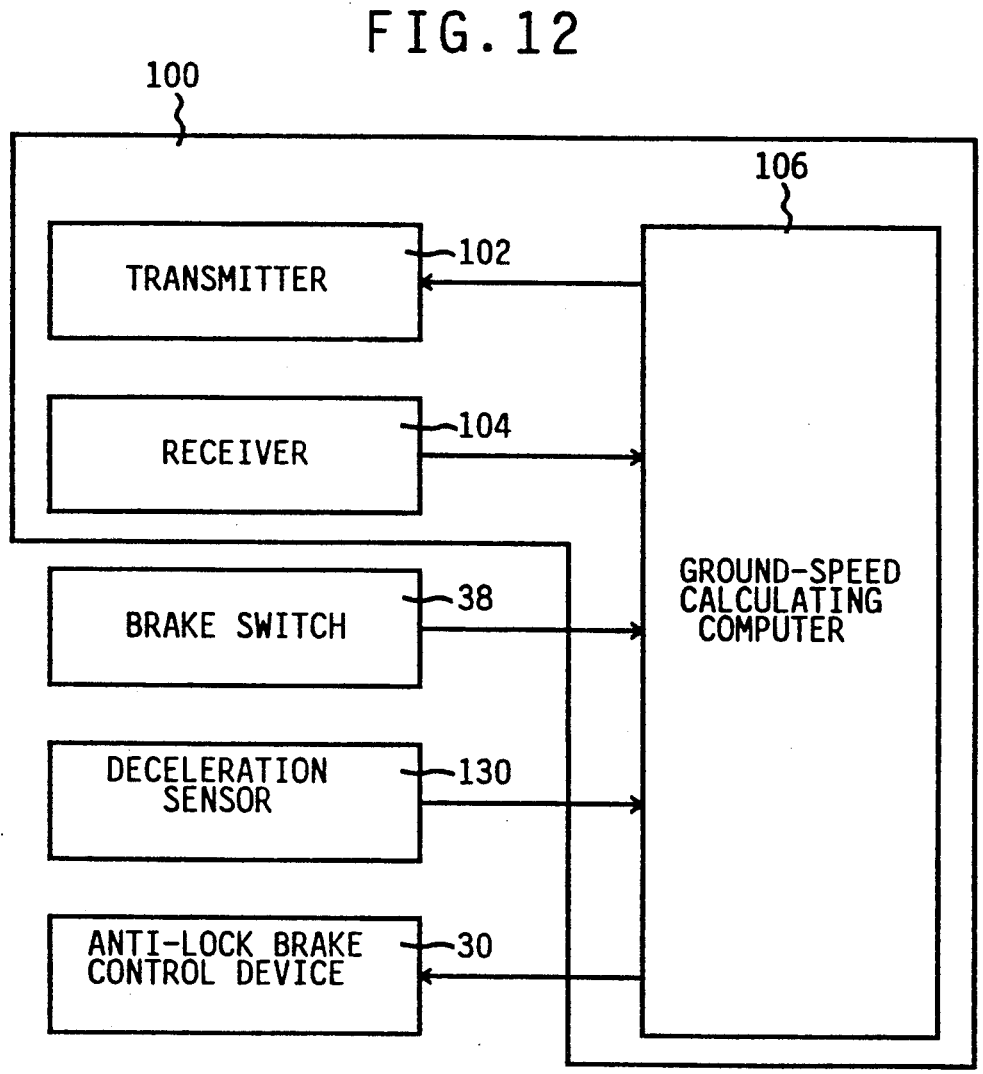
FIG. 12 is a schematic block diagram showing an apparatus according to a fourth embodiment of the present invention.
Figure 13:
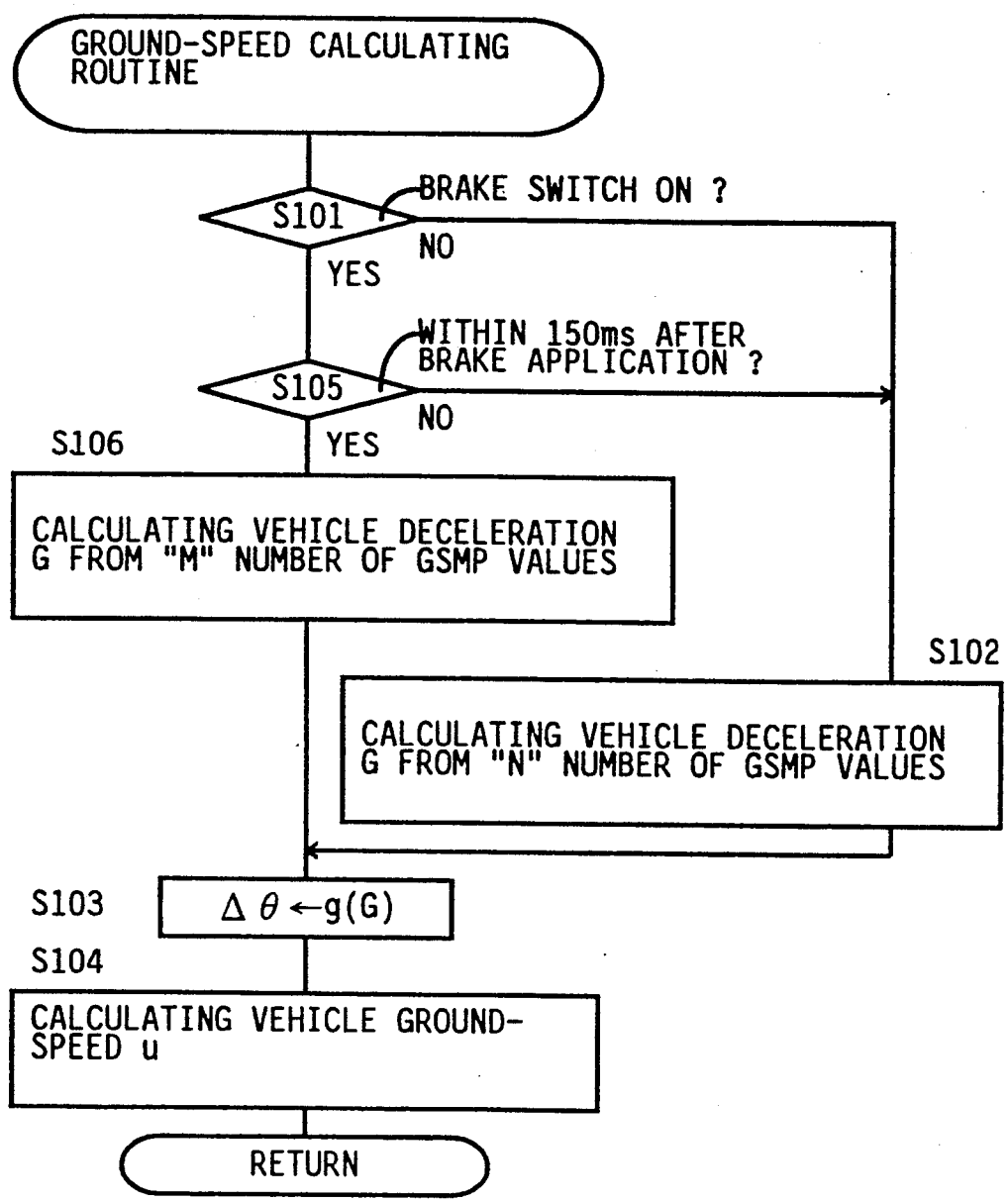
FIG. 13 is a flow chart illustrating a vehicle ground-speed calculating routine in the fourth embodiment.

Referring next to FIGS. 12 and 13, there will be described a Doppler-effect vehicle ground-speed detecting apparatus according to a fourth embodiment of the present invention. This detecting apparatus uses a Doppler-effect vehicle ground-speed detecting device 100, which includes a transmitter 102, a receiver 104, and a ground-speed calculating computer 106 to which are connected the brake switch 38 and the anti-lock control device 30. Unlike the computer 16, 66 used in the first, second and third embodiment, the computer 106 are adapted to receive an output of a deceleration sensor 130, rather than the outputs of the wheel speed sensors 34. The deceleration sensor 130 is adapted to directly detect the deceleration value of the vehicle body. Accordingly, the computer 106 stores a ground-speed calculating routine as shown in the flow chart of FIG. 13.

The routine of FIG. 13 is adapted to: repeatedly determine successive sampling deceleration values GSMP, on the basis of the output of the deceleration sensor 130; obtain a first deceleration value G by averaging a predetermined first number ("M") of the successive sampling deceleration values GSMP as counted from the last sampling value, during a first or initial period of time of 150 ms after brake application to the vehicle, in which the angle $\theta$ considerably changes; obtains a second deceleration value G by averaging a predetermined second number ("N") of the successive sampling deceleration values GSMP, during a second period of time following the first period, in which the angle $\theta$ of the transmitter and receiver 102, 104 is relatively steady,; and determine the amount of change $\Delta\theta$ on the basis of the thus obtained first or second average deceleration value G of the vehicle body. The first number "M" is smaller than the second number "N".

Described in more detail, step S101 is initially implemented to check to see if the brake switch 38 is turned on. If not, step S102 is implemented to obtain the second deceleration value G by averaging the predetermined second number ("N") of the successive sampling deceleration values GSMP. Then, step S103 is implemented to calculate the amount of change $\Delta\theta$ on the basis of the obtained second deceleration value G, and according to a predetermined relationship between the amount of change $\Delta\theta$ and the deceleration value G, which relationship is stored in a read-only memory of the computer 106. Step S103 is followed by step S104 in which the ground-speed "u" is calculated on the basis of the amount of change $\Delta\theta$, reference angle $\theta_0$, and transmitting and receiving frequencies $f_T$, $f_R$ of the transmitter and receiver 102, 104.

When the brake switch 38 is turned on, step S101 is followed by step S105 to determine whether the current point of time is within a time period of 150 ms after the brake switch 38 was turned on. If so, an affirmative decision (YES) is obtained in step S105, and the control flow goes to step S106 in which the first deceleration value G is obtained by averaging the predetermined first number ("M") of the successive sampling deceleration values GSMP. Step S106 is followed by step S103 described above.

When the period of 150 ms has expired after repeated implementation of steps S101, S105, S106, S103 and S104, a negative decision (NO) is obtained in step S105, and the control flow goes to step 102 described above, in which the predetermined second number ("N") of the sampling deceleration values GSMP are averaged to obtain the second deceleration value G, on which the amount of change $\Delta\theta$ is determined in step S103.

It will be understood from the above description of the fourth embodiment that steps S101, S102, S105 and S106 of the routine of FIG. 13 correspond to deceleration determining means for repeatedly determining successive samples of the deceleration values GSMP on the basis of the output of the deceleration sensor 130. The deceleration determining means and the deceleration sensor 130 cooperate to constitute the deceleration obtaining means. Further, steps S103 and S104 of the routine of FIG. 13 correspond to the ground-speed determining means for determining the ground-speed "u".

In the above, first, second, third and fourth embodiment, the deceleration value G (GMEAN1, GMEAN2) is used as a parameter which represents a change ($\Delta\theta$) in the angle $\theta$ at which the transmitter and receiver 12, 14, 62, 64, 102, 104 face the road surface. However, the amount of change $\Delta\theta$ may be determined by detecting an inclination angle of the vehicle body with respect to the road surface in the plane parallel to the running direction of the vehicle and perpendicular to the road surface.

Figure 14:
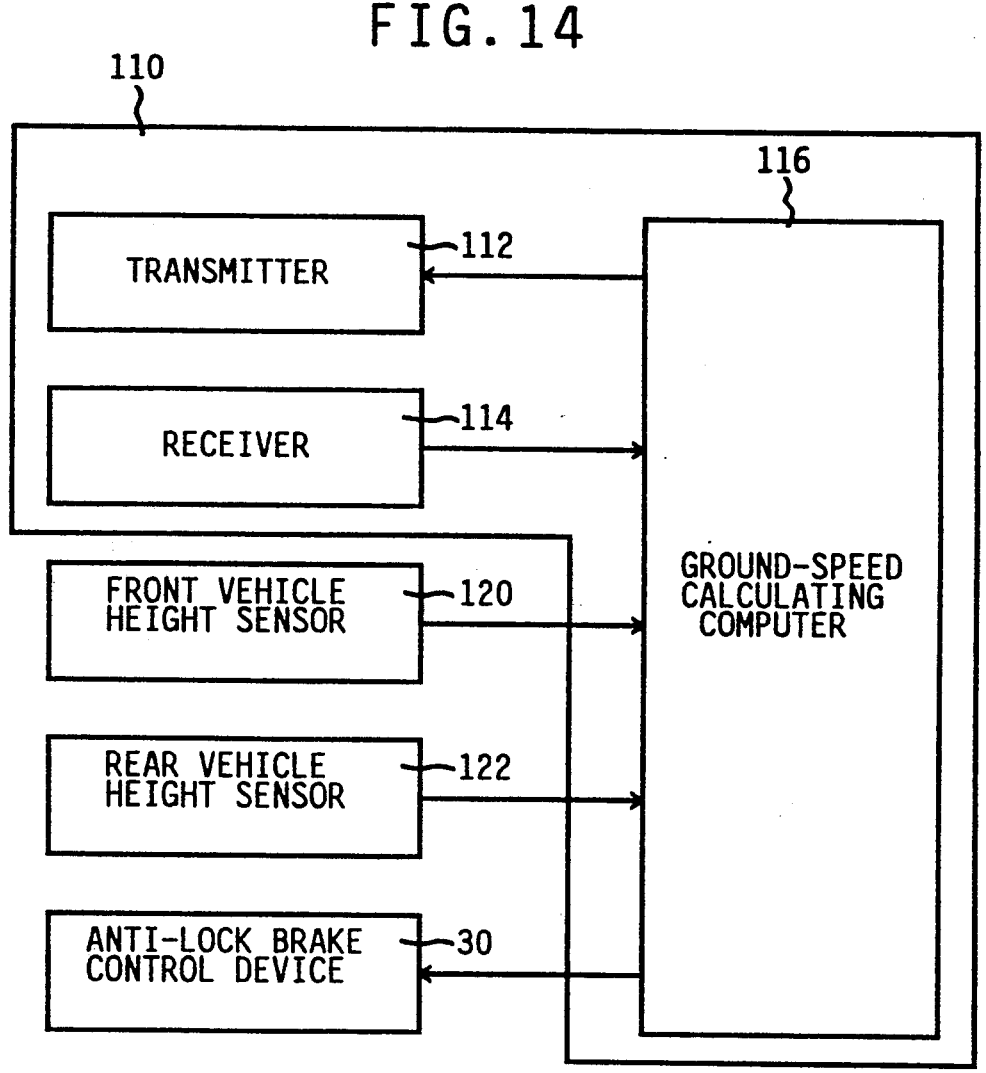
FIG. 14 is a schematic block diagram showing an apparatus according to a fifth embodiment of the invention.
Figure 15:
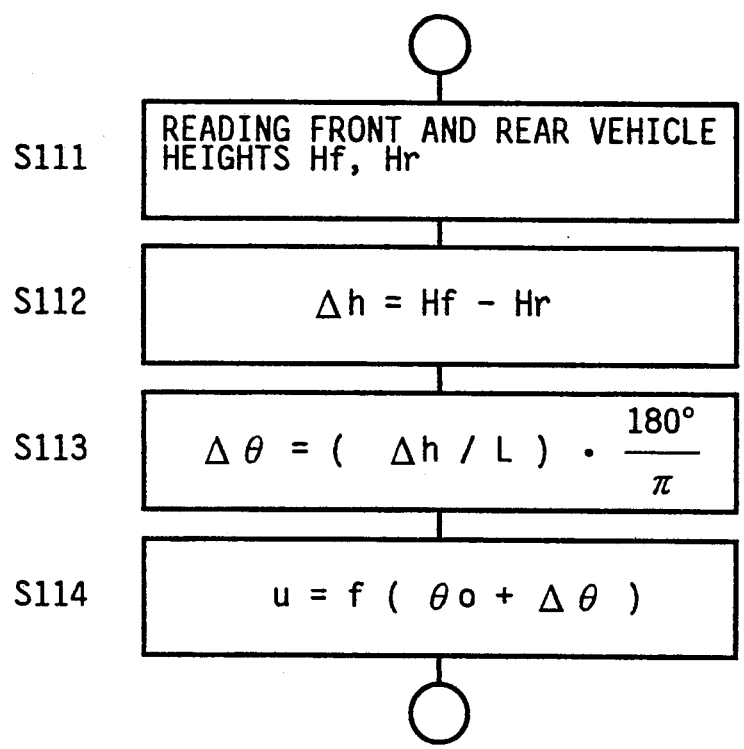
FIG. 15 is a flow chart illustrating a vehicle ground-speed calculating routine in the fifth embodiment.

Referring to FIGS. 14 and 15, there will be described a fifth embodiment of this invention, which is adapted to detect the inclination angle of the vehicle body to determine the amount of change $\Delta\theta$.

The detecting apparatus according to the present fifth embodiment uses a Doppler-effect vehicle ground-speed detecting device 110, which includes a transmitter 112, a receiver 114, and a ground-speed calculating computer 116. The transmitter and receiver 112, 114 are attached to the vehicle body in the same manner as the transmitter and receiver 12, 14 of the first embodiment of FIG. 1.

The computer 116 is adapted to receive the outputs of a front vehicle height sensor 120 and a rear vehicle height sensor 122, for calculating the amount of change $\Delta\theta$. A signal representative of the ground-speed "u" calculated on the basis of the calculated amount of change $\Delta\theta$ is sent to the anti-lock control device 30 as shown in FIG. 2.

The front vehicle height sensor 120 is fixed to a front portion of the vehicle body at which the front wheels are attached, while the rear vehicle height sensor 122 is fixed to a rear portion of the vehicle body at which the rear wheels are attached.

In the present fifth embodiment, the ground-speed "u" of the vehicle is calculated according to a routine illustrated in the flow chart of FIG. 13.

Initially, step S111 is implemented to read rear and front vehicle heights Hf and Hr detected by the respective sensors 120, 122. These heights Hf, Hr are expressed as displacements of the front and rear portions of the vehicle body from the nominal front and rear vehicle heights. The detected height values Hf, Hr are positive when the actual heights are smaller than the nominal heights, and negative when the actual heights are larger than the nominal heights. Step S111 is followed by step S112 in which a difference $\Delta h$ is calculated from the front and rear height values Hf, Hr. This difference h, which represents an amount of pitching of the vehicle body, is a positive value when the front portion of the vehicle body is lower than the rear portion of the vehicle body, and a negative value when the front body portion is higher than the rear body portion. The degree of pitching of the vehicle increases with the difference $\Delta h$.

Then, the control flow goes to step S112 in which the amount of change $\Delta\theta$ is calculated on the basis of the calculated difference $\Delta h$, according to the following equation:

$$\Delta r = (\Delta h/L) \cdot (180°/\pi)$$

where, L: wheel base of the vehicle body

Step S113 is followed by step S114 in which the ground-speed "u" of the vehicle is calculated on the basis of the amount of change $\Delta r$, reference angle $\theta_0$, and Doppler shift $\Delta f$, according to the equation described above with respect to step S3 of the first embodiment.

Experiments conducted on a vehicle having a conventional Doppler-effect vehicle ground-speed detecting apparatus showed that the ground-speed "u" detected without the amount of change $\Delta\theta$ taken into account included a detecting error of about 5% due to the amount of change $\Delta\theta$, when the vehicle body undergoes a maximum angle of incination (pitching) of about about 2°, which occurs when an abrupt brake is applied to the vehicle. Experiments conducted on a vehicle having the apparatus according to the present fifth embodiment confirmed the detecting error as small as about 0.5%.

Thus, the present embodiment wherein the amount of change $\Delta\theta$ is obtained from the height difference at the front and rear portions of the vehicle body is also effective to improve the accuracy of detection of the ground-speed "u" of the vehicle, by eliminating the influence of the brake dive of the vehicle body on the detected ground-speed.

While the present invention has been described above in detail in its presently preferred embodiments with a certain degree of particularity, it is to be understood that the invention is not limited to the details of the illustrated embodiments, but may be embodied with various changes, modification and improvements, which may occur to those skilled in the art, without departing from the spirit and scope of the invention defined in the following claims.

What is claimed is:

1. A Doppler-effect vehicle ground-speed detecting apparatus having a transmitter fixed to a body of a vehicle and transmitting a wave toward a road surface on which the vehicle is running, a receiver fixed to said body and receiving a portion of said wave reflected by the road surface, and ground-speed determining means for determining a ground-speed of the vehicle relative to said road surface, on the basis of a transmitting frequency of said wave as transmitted by said transmitter and a receiving frequency of said portion of the wave as received by said receiver, wherein the improvement comprises:

said ground-speed determining means determining said ground-speed of said vehicle, on the basis of a parameter which changes with an angle of said body of the vehicle relative to said road surface in a plane parallel to a running direction of the vehicle and perpendicular to said road surface, as well as on the basis of a relationship between said transmitting and receiving frequencies;

wherein said ground-speed determining means comprises:

wheel-speed detecting means for detecting a rotating speed of each of a plurality of wheels of said vehicle;

acceleration-deceleration calculating means for calculating an acceleration value or a deceleration value of said body of the vehicle, on the basis of an output of said wheel-speed detecting means;

a compensating-value calculating means for calculating a compensating value which corresponds to said acceleration or deceleration value calculated by said acceleration-deceleration calculating means; and compensating means for compensating said ground-speed of the vehicle, by adjusting a ground-speed of the vehicle corresponding to a reference angle of said body relative to which road surface in said plane when said acceleration or deceleration value is zero, by said compensating value calculated by said compensating-value calculating means.

2. A Doppler-effect vehicle ground-speed detecting apparatus having a transmitter fixed to a body of a vehicle and transmitting a wave toward a road surface on which the vehicle is running, a receiver fixed to said body and receiving a portion of said wave reflected by the road surface, and ground-speed determining means for determining a ground-speed of the vehicle relative to said road surface, on the basis of a transmitting frequency of said wave as transmitted by said transmitter and a receiving frequency of said portion of the wave as received by said receiver, wherein the improvement comprises:

said ground-speed determining means determining said ground-speed of said vehicle, on the basis of a parameter which changes with an angle of said body of the vehicle relative to said road surface in a plane parallel to a running direction of the vehicle and perpendicular to said road surface, as well as on the basis of a relationship between said transmitting and receiving frequencies;

wherein said ground-speed determining means comprises:

wheel-speed detecting means for detecting a rotating speed of each of a plurality of wheels of said vehicle;

acceleration-deceleration calculating means for calculating an acceleration value or a deceleration value of said body of the vehicle, on the basis of an output of said wheel-speed detecting means; and angle calculating means for calculating said angle as said parameter, on the basis of said acceleration or deceleration value of said body, and a reference angle of said body relative to said road surface in said plane when said acceleration or deceleration value is zero.

3. A Doppler-effect vehicle ground-speed detecting apparatus according to claim 2, wherein said acceleration-deceleration calculating means repeatedly calculates said acceleration or deceleration value during a predetermined period of time after commencement of application of a brake to said vehicle, and maintains the acceleration or deceleration value calculated last within said predetermined period, after said predetermined period has elapsed.

4. A Doppler-effect vehicle ground-speed detecting apparatus according to claim 3, wherein said acceleration-deceleration calculating means calculates successive samples of said deceleration value at a predetermined time interval during said predetermined period of time, and calculates said deceleration value on the basis of a predetermined number of said successive samples as counted from the last sample.

5. A Doppler-effect vehicle ground-speed detecting apparatus according to claim 2, wherein said angle calculating means obtains an amount of change in said angle of said body of the vehicle which corresponds to said acceleration or deceleration value calculated by said acceleration-deceleration calculating means, said angle calculating means calculating said angle of said body on the basis of said amount of change and said reference angle.

6. A Doppler-effect vehicle ground-speed detecting apparatus according to claim 2, wherein said transmitter and receiver are oriented in a forward direction of the vehicle, so as to face said road surface at an acute angle relative thereto in said plane.

7. A Doppler-effect vehicle ground-speed detecting apparatus according to claim 2, wherein said transmitter and receiver are oriented in a backward direction of the vehicle, so as to face said road surface at an acute angle in said plane.

8. A Doppler-effect vehicle ground-speed detecting apparatus having a transmitter fixed to a body of a vehicle and transmitting a wave toward a road surface on which the vehicle is running, a receiver fixed to said body and received a portion of said wave reflected by the road surface, and ground-speed determining means for determining a ground-speed of the vehicle relative to said road surface, on the basis of a transmitting frequency of said wave as transmitted by said transmitter and a receiving frequency of said portion of the wave as received by said receiver, wherein the improvement comprises:

said ground-speed determining means determining said ground-speed of said vehicle, on the basis of a parameter which changes with an angle of said body of the vehicle relative to said road surface in a plane parallel to a running direction of the vehicle and perpendicular to said road surface, as well as on the basis of a relationship between said transmitting and receiving frequencies;

wherein said ground-speed determining means comprises acceleration-deceleration obtaining means for obtaining as said parameter an acceleration value or a deceleration value of said body of the vehicle, wherein said acceleration-deceleration obtaining means comprises:

an acceleration-deceleration sensor for detecting an acceleration or deceleration value of said body of the vehicle;

acceleration-deceleration determining means for repeatedly determining successive samples of said acceleration or deceleration values on the basis of an output of said acceleration-deceleration sensor, said acceleration-deceleration determining means obtaining a first value as said parameter on the basis of a predetermined first number of said successive samples as counted from the last sample, during a first period of time after commencement of application of a brake to said vehicle; and said acceleration-deceleration determining means obtaining a second value as said parameter on the basis of a predetermined second number of said successive samples as counted from the last sample, during a second period of time following said first period, said second number being larger than said first number.

9. A Doppler-effect vehicle ground-speed detecting apparatus according to claim 8, wherein said transmitter and receiver are oriented in a forward direction of the vehicle, so as to face said road surface at an acute angle relative thereto in said plane.

10. A Doppler-effect vehicle ground-speed detecting apparatus according to claim 8, wherein said acceleration-deceleration determining means obtains as said first value an average of said predetermined first number of said samples, and as said second value an average of said second predetermined second number of said samples.

11. A Doppler-effect vehicle ground-speed detecting apparatus according to claim 8, wherein said transmitter and receiver are oriented in a backward direction of the vehicle, so as to face said road surface at an acute angle in said plane.

12. A Doppler-effect vehicle ground-speed detecting apparatus having a transmitter fixed to a body of a vehicle and transmitting a wave toward a road surface on which the vehicle is running, a receiver fixed to said body and receiving a portion of said wave reflected by the road surface, and ground-speed determining means for determining a ground-speed of the vehicle relative to said road surface, on the basis of a transmitting frequency of said wave as transmitted by said transmitter and a receiving frequency of said portion of the wave as received by said receiver, wherein the improvement comprises:

said ground-speed determining means determining said ground-speed of said vehicle, on the basis of a parameter which changes with an angle of said body of the vehicle relative to said road surface in a plane parallel to a running direction of the vehicle and perpendicular to said road surface, as well as on the basis of a relationship between said transmitting and receiving frequencies;

wherein said vehicle has a front and a rear wheel attached to a front and a rear portion of said body, respectively, and said ground-speed determining means comprises:

a front vehicle height sensor for detecting a front height of said body between said front portion and said road surface;

a rear vehicle height sensor for detecting a rear height of said body between said rear portion and said road surface; and angle determining means for determining as said parameter said angle of said body of the vehicle relative to said road surface in said plane, on the basis of outputs of said front and rear vehicle height sensors.

13. A Doppler-effect vehicle ground-speed detecting apparatus according to claim 12, wherein said transmitter and receiver are oriented in a forward direction of the vehicle, so as to face said road surface at an acute angle relative thereto in said plane.

14. A Doppler-effect vehicle ground-speed detecting apparatus according to claim 12, wherein said transmitter and receiver are oriented in a backward direction of the vehicle, so as to face said road surface at an acute angle in said plane.

15. A Doppler-effect vehicle ground-speed detecting apparatus having a transmitter fixed to a body of a vehicle and transmitting a wave toward a road surface on which the vehicle is running, a receiver fixed to said body and receiving a portion of said wave reflected by the road surface, and ground-speed determining means for determining a ground-speed of the vehicle relative to said road surface, on the basis of a transmitting frequency of said wave as transmitted by said transmitter and a receiving frequency of said portion of the wave as received by said receiver, wherein the improvement comprises:

said ground-speed determining means determined said ground-speed of said vehicle, on the basis of a parameter which changes with an angle of said body of the vehicle relative to said road surface in a plane parallel to a running direction of the vehicle and perpendicular to said road surface, as well as on the basis of a relationship between said transmitting and receiving frequencies;

said ground-speed detecting apparatus being provided for an anti-lock brake control device for controlling a braking pressure applied to each of a plurality of wheels of the vehicle, so as to avoid locking of said each wheel, on the basis of a relationship between a rotating speed of said each wheel detected by a corresponding one of a plurality of wheel speed sensors and said ground-speed determining means, and said acceleration-deceleration obtaining means comprises:

vehicle-speed estimating means for obtaining an estimated speed of the vehicle, on the basis of the rotating speeds of said plurality of wheels detected by said wheel speed sensors;

sampling means for obtaining samples of said acceleration or deceleration value of said body of the vehicle, each of said samples being equal to a difference between successive two values of said estimated speed of the vehicle obtained by said vehicle-speed estimating means; and acceleration-deceleration determining means for receiving said samples of said acceleration or deceleration value one after another from said sampling means, said acceleration-deceleration determining means obtaining a first value as said parameter on the basis of the predetermined first number of said samples as counted from the last received sample, during a first period of time between commencement of application of the braking pressure to each wheel and a moment between commencement of anti-lock control of the braking pressure and commencement of an increase in said estimated speed of the vehicle as a result of said anti-lock control of said braking pressure, said acceleration-deceleration determining means determining as said parameter said first value which is obtained last during said first period of time, during a second period of time between expiration of said first period of commencement of a decrease in said estimated speed of the vehicle, said acceleration-deceleration determining means obtaining a second value as said parameter on the basis of a predetermined second number of said samples as counted from the last sample, during a third period of time between expiration of said second period and termination of said anti-lock control of said braking pressure, said second number being larger than said first number.

16. A Doppler-effect vehicle ground-speed detecting apparatus according to claim 15, wherein said acceleration-deceleration determining means obtains said first and second values on the basis of respective regression lines obtained from said predetermined first and second numbers of said samples, respectively.

* * * * *